United States Patent [19]
Hogle, IV

[11] Patent Number: 5,923,307
[45] Date of Patent: Jul. 13, 1999

[54] LOGICAL MONITOR CONFIGURATION IN A MULTIPLE MONITOR ENVIRONMENT

[75] Inventor: Francis M. Hogle, IV, Redmond, Wash.

[73] Assignee: Microsoft Corporation, Redmond, Wash.

[21] Appl. No.: 08/786,972

[22] Filed: Jan. 27, 1997

[51] Int. Cl.$^6$ ........................................... G06F 3/00
[52] U.S. Cl. ................................. 345/4; 345/342
[58] Field of Search ................... 345/326–358, 345/1, 3, 4, 5, 6

[56] References Cited

U.S. PATENT DOCUMENTS

| | | | |
|---|---|---|---|
| 5,107,251 | 4/1992 | Frank et al. | 340/709 |
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |

OTHER PUBLICATIONS

Ishii, "TemWorkStation: TWoards a Seamless Shared Workspace", CSCW '90 Proceedings, pp. 12–26, Oct. 1990.
"HydraVision Press Release", Applian Graphics, Internet site: appiantech.com, Feb. 5, 1996.
Shirley, John and Rosenberry, Ward, "Microsoft RPC Programming Guide", O'Reilly & Associates, 1995.
Kramer, Matt, "Baranof's MailCheck 2.6 Delivers Improved Tools",PC Week, Sep. 11, 1995, Ziff–Davis Publishing Company 1995, Full Text.
Frenkel, Gary, "cc:Mail View Keeps an Eye on Your Messaging System", Network Computing, Jun. 1, 1995, CMP Publications, Inc., 1995, Full Text.
Inside Macintosh, Apple Computer, Inc., published 1985, pp. 9,17,20.
Webster, Bruce F., "Just How Compatible is Compatible?", MACWORLD, Nov. 1987, vol. 4, No. 11, pp. 108–113.
Borrell, Jerry, "The Graphic Mac", MACWORLD, Nov. 1986, vol. 3, No. 11, pp. 100–105.
Ushijima, David, Chasing Rainbows, MACWORLD, Jul. 1987, vol. 4, No. 7, pp. 109–115.
Inside Macintosh, vol. V, Apple Computer, Inc., 1988, pp. 123–127.
Heid, Jim, "Working Smart", MACWORLD, Oct. 1995, pp. 145–146.
"A Mac of a Different Color", MACWORLD, Apr. 1987, vol. 4, No. 4, pp.132–133.
Heid, Jim, "Approaching the Mac II", MACWORLD, Jun. 1987, vol. 4, No. 6, pp. 130–133.
FairNet, (MAC)System 7.5: Advanced, at Internet site: fnft@aurora.alaska.edu, Nov. 18, 1996.
"Multiple Monitor Applications", Sep. 27, 1996, Appian Graphics, at Internet site: appiantech.com.
"Macintosh Computers Offer More Flexible Monitor Support", The Macintosh Advantage, Apple Computer, Sep. 27, 1996. at Internet site: product.info.ap . . . dvantages/monitor.html.
"Using Two Monitors", Sep. 27, 1996.
Poor, Alfred, "Double Vision: Appian's Impulse Graphics Card Gives Your Monitor a View–or Two", PC Magazine, May 14, 1996, Ziff–Davis Publishing Company 1996.

*Primary Examiner*—John E. Breene
*Attorney, Agent, or Firm*—Workman Nydegger & Seeley

[57] ABSTRACT

A computer system arranges multiple monitors in logical space to form a contiguous and non-overlapping region by determining relative positions in logical space for the monitor spaces, comparing the relative positions of the monitor spaces, and positioning the monitor spaces in logical space based on a result of the comparing. The comparing and positioning may be performed upon initialization of the computer system, or automatically in response to a geometry change (e.g., add/remove/move monitor, change monitor characteristics), or both. Following a monitor geometry change, windows or other graphic objects appearing in the monitor spaces may be positioned as needed to maintain a robust virtual desktop environment.

48 Claims, 32 Drawing Sheets

CROSSING

CONTAINED

DIAGONAL

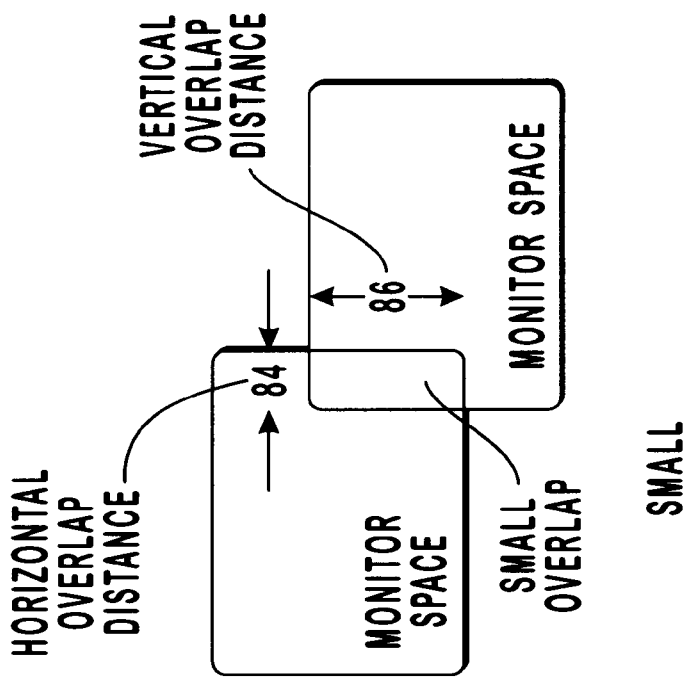
FIG. 13(g) SMALL
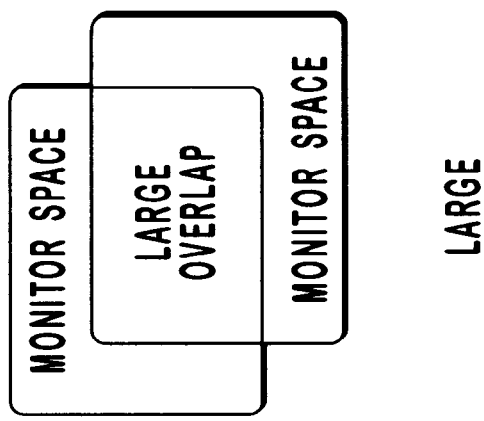
FIG. 13(f) LARGE

NEARLY HORIZONTAL

NEARLY VERTICAL

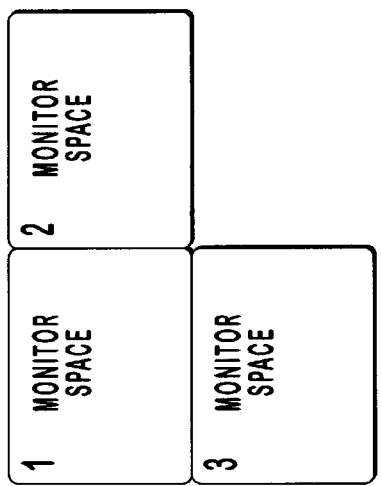
FIG. 14(a)
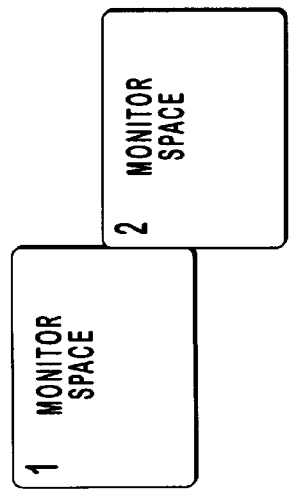
FIG. 14(b)
FIG. 14(c)
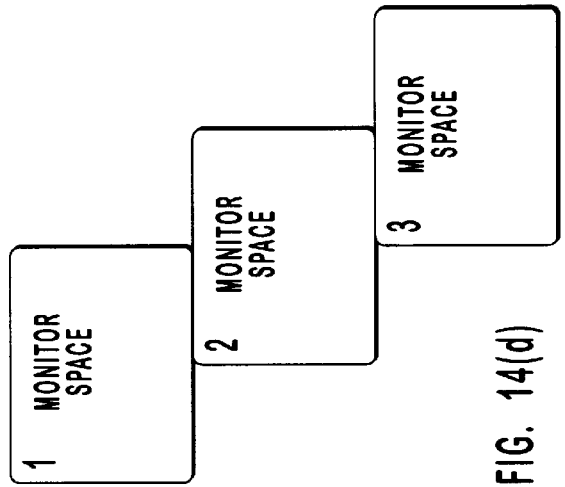
FIG. 14(d)

LOGICAL MONITOR CONFIGURATION IN A MULTIPLE MONITOR ENVIRONMENT

BACKGROUND

This invention relates to configuring monitor screen displays in a multiple monitor environment.

A typical computer system as shown in FIG. 1 includes a computer 300 having a central processing unit 304, an input/output unit 306 and memory 302 containing various programs used by the computer 300 such as an operating system 303 and one or more application programs 305. An end-user of the computer system communicates with computer by means of various input devices (keyboard 320, mouse 310) which transfer information to the computer via input/output unit 306. The computer 300 replies to this input data, among other ways, by providing responsive output to the end-user, for example, by displaying appropriate text and images on the screen of a display monitor 330.

Operating systems often include a graphical user interface ("GUI") by which the operating system and any applications it may be running (e.g., a word-processing program) may communicate with an end-user. A commonly used GUI implementation employs a desktop metaphor in which the screen of the monitor is regarded as a virtual desktop. The desktop is an essentially two-dimensional working template area supporting various graphic objects, including one or more display regions (e.g., window, dialog box, pop-up menu, pull-down menu, drop-down list, icon). As shown in FIG. 2, information is displayed on the desktop 21 within display regions 23, which typically are rectangular in shape. Each display region 23 may be dedicated to a specific application or to the operating system under which the applications are running. By manipulating a cursor 25 (such as with standard point & click and drag & drop techniques), an end-user can manage the display regions 23 as desired, for example, by creating new display regions or eliminating old ones, or by resizing or repositioning the display regions to fit the end-user's needs. The end-user may "activate" a particular display region and its associated application, for example, by "clicking" the cursor 25 when it appears within the desired region.

In a computer system using a single monitor 330 as shown in FIG. 1, a problem of screen clutter may occur when an end-user has a large number of display regions open on the monitor at the same time. Screen clutter tends to confuse the end-user and reduce his or her efficiency. Moreover, end-users of certain applications (desktop publishing, CAD/CAM/CAE, videoconferencing, etc.) typically will want to be able to view and use two large display regions (e.g., an editing window and an output window) at substantially the same time, but often the most useful sizes of the two windows are too large to fit side-by-side on a single monitor.

To alleviate this problem, a computer system such as that shown in FIG. 3 having two monitors 330 and 332 has been used. Each monitor 330, 332 has a monitor space 41, 43 which is defined by the logical height and width of the display. In the multiple monitor system of FIG. 3, the combination of the monitor spaces (two in the case shown—one monitor space 41 corresponding to monitor 330 and a second monitor space 43 corresponding to monitor 332) may be treated as a single, continuous display space—e.g., virtual desktop 45 as shown in FIG. 4. Through appropriate cursor manipulations, an end-user may move objects, such as windows A, B, C, D and cursor 25, back and forth between the two monitor spaces 41 and 43 or may even position one of these objects (e.g., window C in FIG. 4) so that it spans the two monitor spaces.

SUMMARY

In one aspect of the invention, a computer system arranges multiple monitors in logical space to form a contiguous and non-overlapping region by determining relative positions in logical space for the monitor spaces, comparing the relative positions of the monitor spaces, and positioning the monitor spaces in logical space based on a result of the comparing. The comparing and positioning are performed upon initialization of the computer system and/or automatically in response to a geometry change (e.g., add/remove/move monitor, change a monitor characteristic such as a resolution parameter).

In one embodiment, the comparison of monitor spaces is accomplished by iteratively comparing the position of each monitor space against every other monitor space and determining, for example, whether any two monitor spaces overlap one another or whether gaps exist between the monitor spaces. Based on this determination, monitor spaces may be moved inward in logical space to remove gaps between monitor spaces, or they may be moved outward in logical space until no monitor space overlaps any other monitor space. This movement may occur in an iterative fashion by moving one monitor at a time. Moreover, the monitor spaces may be moved first outward in logical space until no monitor space overlaps any other monitor space, and then moved inward in logical space to remove gaps between monitor spaces and form a contiguous, non-overlapping virtual desktop.

Certain types of overlaps between monitor spaces may be recognized, for example, horizontal, vertical, large small, nearly vertical, nearly horizontal. Each of these overlap types may be treated differently so that overlaps are resolved in an efficient and logical manner.

The comparison of monitor spaces may involve a comparison between the respective positions of two monitor spaces relative to a predetermined location, for example, the center of the virtual desktop. In that case, one of the two monitor spaces is moved based on a relationship between the predetermined location and the position of the monitor space to be moved. For example, the monitor space that has a center point farther from the center of the virtual desktop may be moved outward in logical space.

In another aspect, multiple monitor spaces may be arranged in logical space by (a) selecting one of the monitor spaces, and (b) comparing its position with another monitor space, for example, to detect the presence of an overlap. Then, (c) one of the two monitor spaces is moved, for example, outward in logical space, based on a result of the comparison in (b). Then in (d), the comparison in (b) and the movement in (c) are repeated until the monitor space selected in (a) does not overlap any other monitor space. For each of the remaining monitor spaces, the operations of (a), (b), (c) and (d) are repeated until no monitor space overlaps any other monitor space. In operation (c), the monitor spaces that has a center point farther from a predetermined location, for example, the center of the virtual desktop, may be the one that is moved outward in logical space.

Following operations (a)–(e), the monitor spaces may be formed into a contiguous region (f) by selecting one of the monitor spaces (for example, the monitor space closest to the center of the virtual desktop) and (g) by designating it as belonging to a known group while designating the unchosen monitor space or spaces as belonging to a unknown group. Then, in operation (h) a monitor space is selected from the unknown group based on a relationship between it and the known group. In (i), the monitor space selected in (h) is moved in logical space, for example, until it becomes contiguous with one of the members of the group of known contiguity. Following the move in (h), the moved monitor space is (i) designated as belonging to the known group. The operations in (h), (i) and (j) are repeated until the monitor spaces form a contiguous region.

In reconfiguring the virtual desktop, the monitor spaces may be moved to a constrained position in logical space, for example, a position which enhances efficiency in an operating system of the computer system. This position may be a boundary aligned at a predetermined number of units in logical space which allows faster drawing operations to be performed among different display regions.

In another aspect, windows or other graphic objects appearing in the monitor spaces may be positioned as needed following a monitor geometry change to maintain a robust virtual desktop environment. In one embodiment, this is accomplished by recording a position for each of the monitor spaces that forms logical display space after a geometry change (e.g., add/remove/move monitor, change of monitor characteristic) has been sensed. The geometry change may be such that it changes the shape and/or orientation of the display space. The graphic object is then manipulated in response to the geometry change, for example, by repositioning it logical space to compensate for the change in shape and/or orientation of the display space. This movement may be such that it causes the graphic object to appear in the same location in a monitor space before and after the geometry change. Alternatively, to compensate for the removal of a monitor space, the movement may be such that it causes the graphic object to appear in a different monitor space than it was in prior to the geometry change.

Advantages of this invention may include one or more of the following. An end-user is provided with a robust virtual desktop environment which may be composed of two or more monitor spaces. At system start-up, the program code will automatically arrange the various monitors plugged into the system in logical space to form a non-overlapping, contiguous region. The program code aligns the monitors in logical space at certain positions that allow the graphics engine to operate in a more efficient manner. The resulting virtual desktop will provide the end-user with increased screen real estate while at the same time it will behave and respond essentially as if it were contained on a single monitor. As a result, the end-user will find that his interaction with the virtual desktop remains logical and predictable even when the desktop spans two or more monitor spaces.

During run-time, an extra monitor may be added on the fly, or an existing monitor may be deactivated and, in response, the program code dynamically adapts the virtual desktop environment accordingly. The program code removes any gaps or overlaps created in the virtual desktop by the change in monitor configuration. This is done in an efficient manner that does not disconcert the end-user. Also in response to a monitor configuration change, the program code dynamically repositions windows or other graphic objects as needed to avert end-user astonishment. This action includes repositioning windows and other graphic objects so that they remain visible to the end-user, and continue to respond to the end-user in a predictable manner, following a change in monitor topology.

Other advantages and features will become apparent from the following description, including the drawings and claims.

The methods and mechanisms described here are not limited to any particular operating system or hardware configuration, but rather they may find applicability in any computing or processing environment that uses multiple output devices.

The techniques described here may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and two or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

BRIEF DESCRIPTION OF THE DRAWINGS

FIGS. 13(a)–13(i) are monitor space diagrams showing different types of overlaps between two monitor spaces.

FIGS. 14(a)–14(d) are monitor space diagrams showing different examples of contiguous, non-overlapping regions.

DETAILED DESCRIPTION

Operating in a multiple monitor environment creates several complexities and problems that are not present in a single monitor environment. In particular, the manner in which the virtual desktop and any graphic objects thereon should be handled and displayed in a GUI in response to end-user input (or application program requirements) varies considerably between the single monitor and multiple monitor environments. If single monitor solutions were applied in a multiple monitor environment, application programs would appear to the end-user to behave incorrectly or strangely and the end-user frequently would be confused and frustrated by his interaction with the GUI. Moreover, if the multiple monitor spaces were not properly arranged in logical space relative to one another, the end-user would be confused by any resulting gaps, overlaps, and/or perceived discontinuities in the virtual desktop. To appreciate the differences between a single monitor and multiple monitor environment with respect to the manner in which monitor spaces and graphic objects should be managed by a GUI, a basic understanding of their respective display architectures is helpful.

Figure 1:
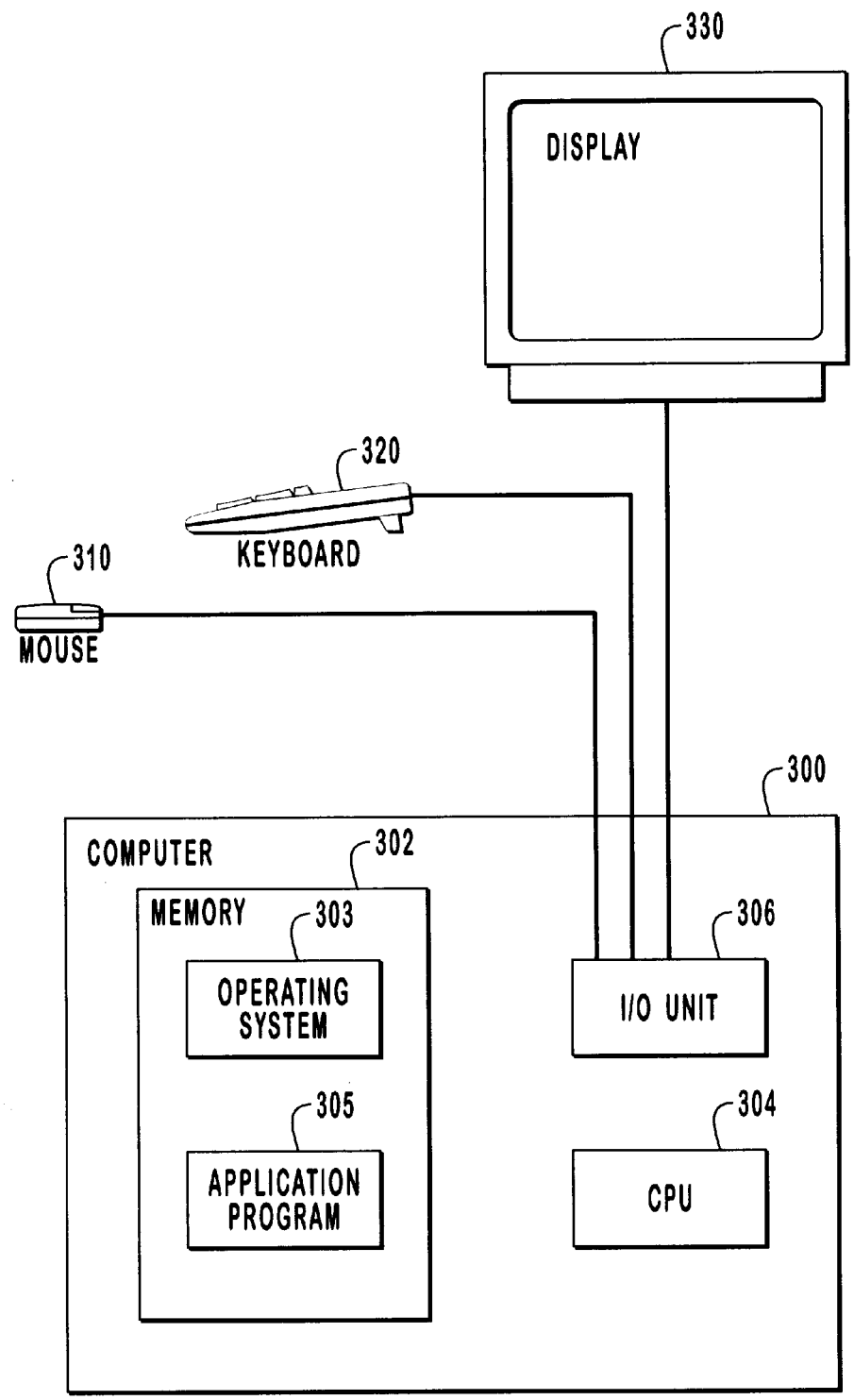
FIG. 1 is a block diagram of a computer system having a single display monitor.
Figure 2:
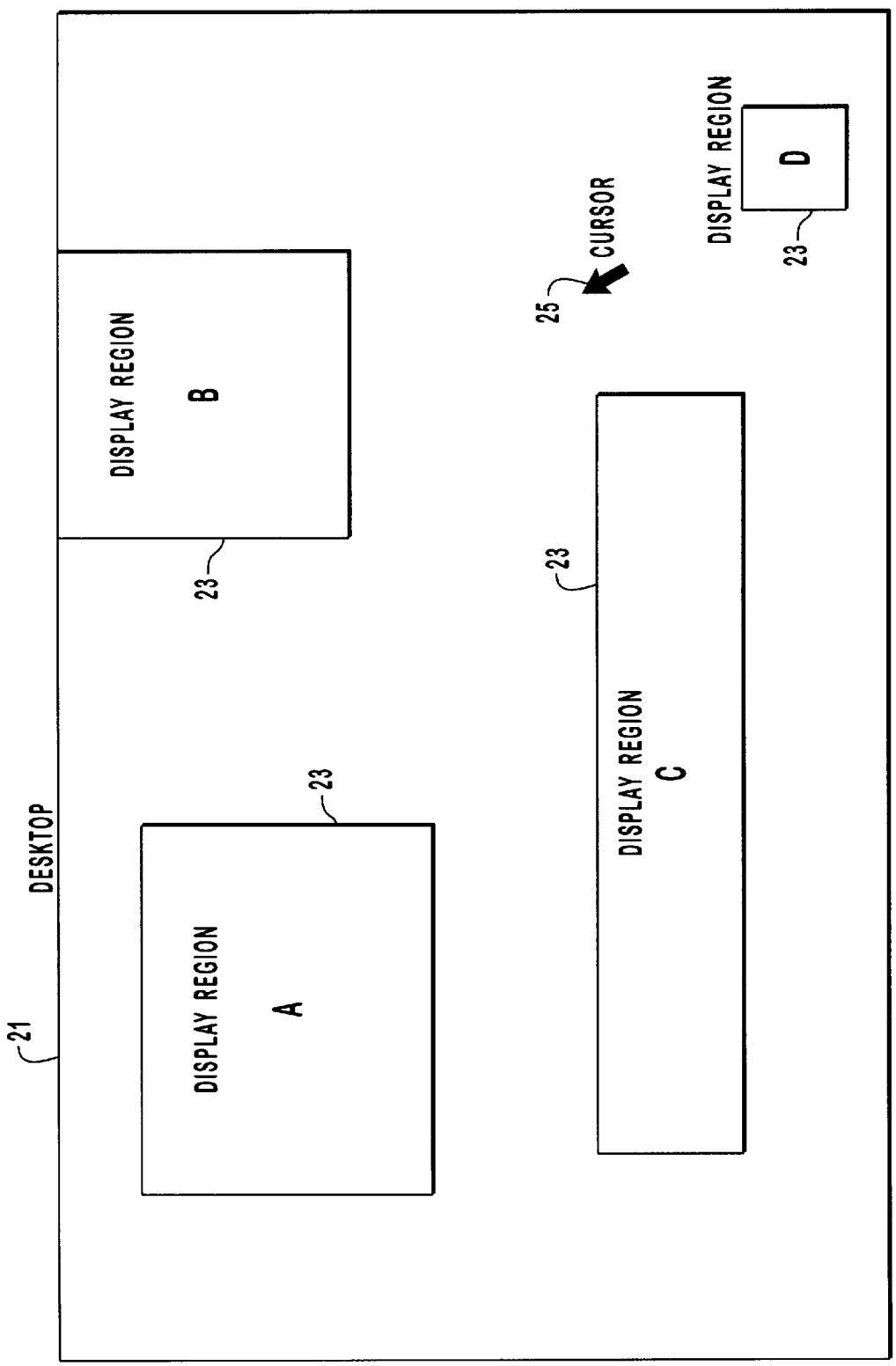
FIG. 2 is a screen diagram showing display regions in a graphical user interface as used in the computer system of FIG. 1.
Figure 3:
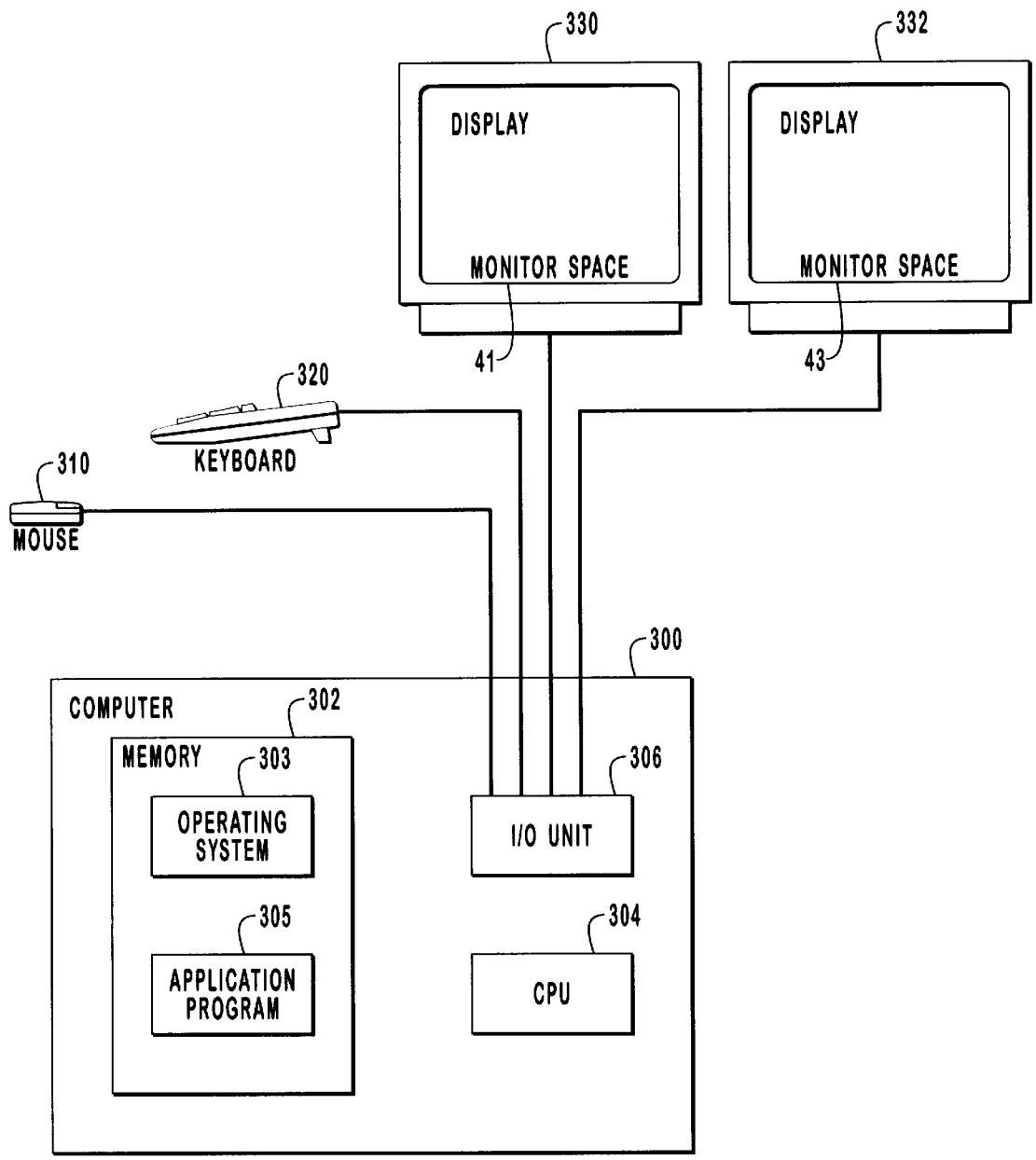
FIG. 3 is a block diagram of a computer system having multiple display monitors.
Figure 4:
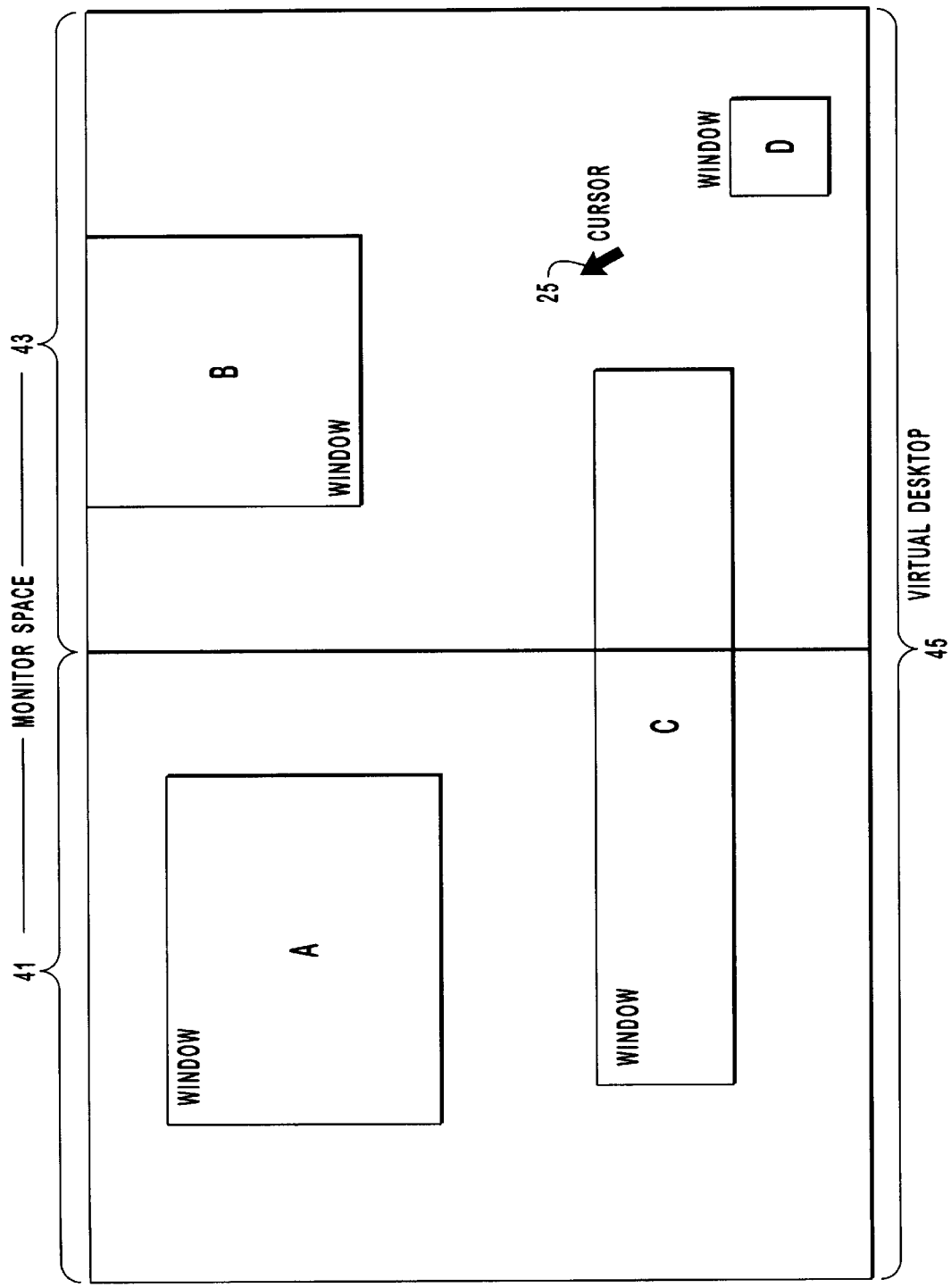
FIG. 4 is a screen diagram showing display regions in a graphical user interface as used in the computer system of FIG. 3.
Figure 5:
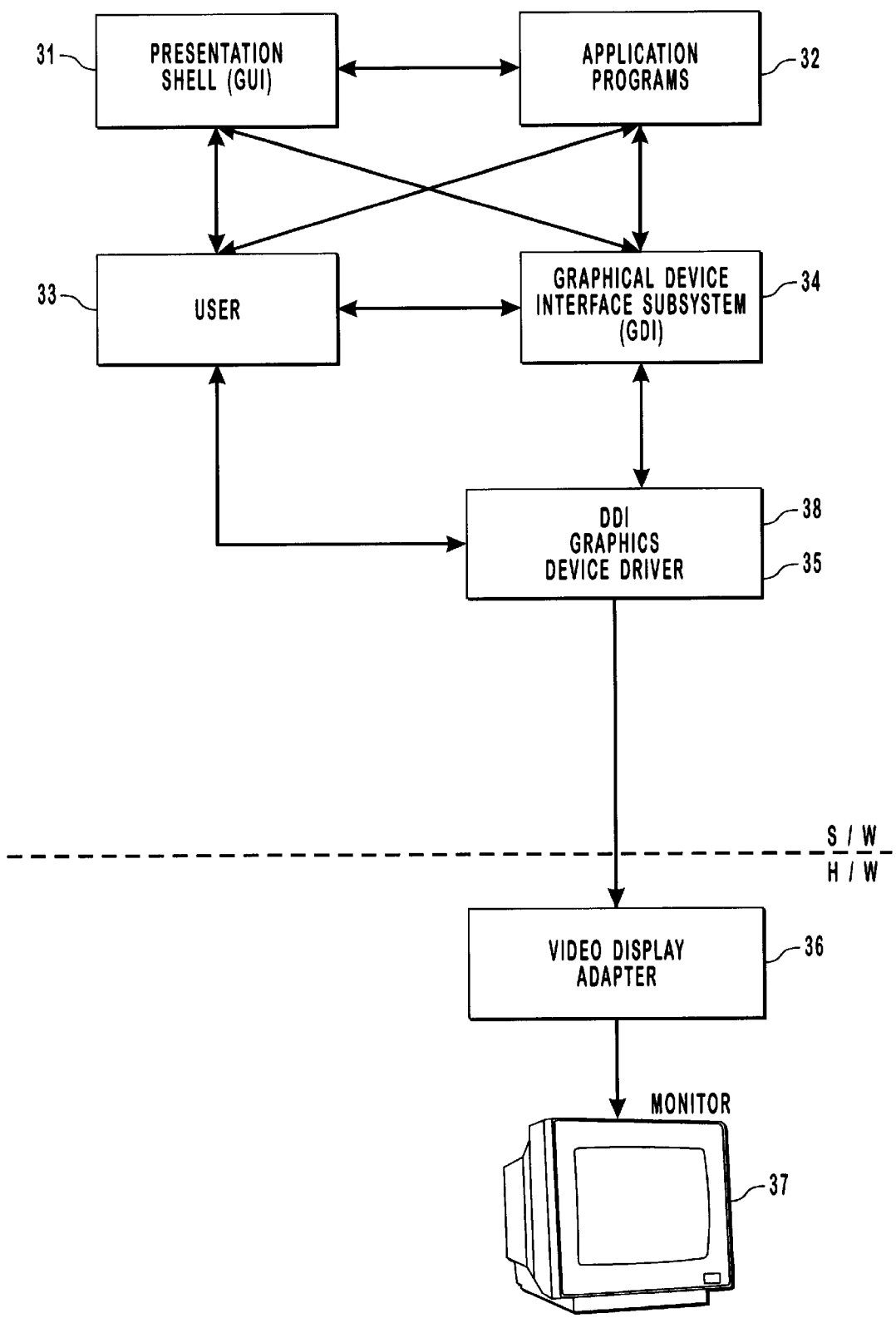
FIG. 5 is a single monitor display architecture block diagram for the computer of FIG. 1.

One operating system that uses a GUI is the Microsoft® Windows®95 operating system, which is described in the Microsoft® Development Library (July 1996), incorporated herein by reference. FIG. 5 is an abstract representation of a display architecture that may be used in Windows®95 for the single monitor computer system of FIG. 1. As shown in FIG. 5, an end-user uses a presentation shell 31 (e.g. a GUI) to communicate with the operating system and one or more application programs 32. An application running on the computer system may display information in one or more of the display regions through a graphical device interface subsystem 34 ("GDI") provided by the operating system. GDI serves as a link between the application program and a graphics device, such as a video display adapter 36 (e.g., a plug-in card) included with the computer to provide graphics output signals to the computer monitor 37.

GDI lies logically between the application program 32 and a graphics device driver 35, which is a computer program designed to control a particular graphics hardware device such as the video display adapter. The device driver is not technically part of the operating system. Rather, the driver is a software module supplementing the operating system for updating the status of the video display adapter and the monitor in response to calls made to functions of the operating system in general and to functions of GDI in particular.

Communication between the GDI and the device driver is facilitated by a device driver interface 38 ("DDI"). DDI 38 is a set of functions provided by the device driver for access by GDI 34. Information is passed between GDI and the device driver through input and output parameters of the DDI functions. A GDI call to the "DrvEnableDriver( )" function initializes the device driver and passes back to GDI a function list of driver-supported DDI functions. GDI itself handles any operations not represented in the function list received. For example, if the device driver lacks an optional function "DrvLineTo( )" for drawing a single solid cosmetic line, GDI handles drawing the line without calling DrvLineTo( ). Another function "DrvDisableDriver( )" is called by GDI when the device driver is to be unloaded. Most of the functions are exposed to GDI through an array of pointers residing in a pointer table.

GDI maintains important internal data structures and provides the device driver with access to public fields (i.e., externally-relevant fields) of these structures by passing the public fields as GDI/DDI software objects to the device driver. Thus, GDI/DDI software objects are intermediate data structures providing an interface between GDI data structures and a device driver needing access to information within the GDI data structures. A typical GDI/DDI software object provides information such as colors of a palette associated with the screen or definitions of brush objects for graphic functions that output lines, text, or fills. The device driver can pass a pointer to a GDI/DDI software object back to GDI to query for information or to request execution of various operations.

In response to application program originated function calls routed through GDI, the device driver ensures that the video display adapter produces the required output. That is, in response to a request from an application, if GDI determines that a function relating to the request is supported by the device driver, GDI calls the function. It is the responsibility of the device driver to execute the function properly and return control to GDI upon completion of processing instructions associated with the function.

Some DDI functions are necessary for communication between GDI and DDI, while others are optional. Necessary DDI functions include "DrvGetModes( )" for listing video modes supported by the adapter and "DrvAssertMode( )" for resetting the video mode. Depending on how a device driver is implemented, other functions may or may not always be necessary. For example, a display driver typically is not required to handle fonts unless the device adapter involved has one or more resident fonts, which are fonts defined by the adapter, not by the operating system. If the adapter has a resident font, the device driver supplies information to GDI about the font.

In the typical situation, the device driver updates the status of the video display adapter in response to calls to its DDI by changing the contents of memory and registers used by the adapter. The memory used by the adapter is referred to as "screen memory" or the "frame buffer." What appears on the monitor's screen is controlled directly by the adapter and corresponds to the contents of the screen memory and the registers. The device driver also typically performs additional functions such as monochrome-to-color conversion of bitmaps, drawing of repetitive patterns in screen memory, and moving of an image from one portion of screen memory to another (referred to as a "bit block transfer" or "BitBlt"). Often, the operating system cannot perform these additional functions as quickly because, unlike the device driver, the operating system is not configured to take advantage of the video display adapter's particular characteristics and capabilities.

When an application or an operating system function needs to use a graphics hardware device such as the video display adapter, the application calls GDI's "CreateDC( )" function, via GDI's application programming interface ("API"), with a data string specifying the name of the device (e.g., "Display"). In response, a data structure known as a "device context" is created for the device. The device context reflects the current state of many attributes determining how GDI functions work on the device. Among the attributes specified in the device context are a text font (i.e., typeface), a text color, the background color behind the text, and intercharacter spacing.

When CreateDC is called, GDI returns a handle ("hDC"), which is a pointer to the device context and which is used later by the application to interact with the device context by passing the handle to other GDI APIs. GDI also identifies a graphics device driver for the device specified by the data string (e.g., "Display"). GDI then calls operating system functions to load the specified device driver. Once the device driver is loaded, GDI is able to communicate with the device through DDI functions. Via the device driver, GDI is able to perform actions such as initializing the device and drawing graphics on the screen of the monitor driven by the device. Multiple hDCs may exist for a single device, so that multiple application programs can cause graphics to be drawn on a single device. GDI handles the synchronization between the hDCs.

GDI has several hundred functions making up several broad groups. One group includes CreateDC( ) and other functions providing the operating system and application programs with the ability to control the existence of device contexts. Another group includes functions providing device context information such as the dimensions of a currently-selected font. Functions relating to displaying text or drawing graphics such as lines, filled areas, and bit-mapped images are included in another group. Still another group provides functions for setting and determining the status of device context attributes relating to details such as the color and justification of text. Functions of yet another group provide access to GDI objects, which are constructs such as logical pens and brushes, and which allow the setting of widths and styles of lines and other graphics drawn in the display windows on the screen.

The display windows appearing on the screen are contained within a logical space corresponding to the desktop. The screen of the monitor may show only a portion of the desktop at any given time. The operating system allows applications running on the computer to specify desktop object characteristics such as colors, font sizes, output resolutions and the like without regard for the specific limitations of a particular video display adapter or monitor. GDI converts the application's specified characteristics to conform to the adapter's and monitor's limitations. For example, the application may specify a yellow color, but the adapter and monitor combination may be capable of displaying gray scales only. If so, GDI converts the yellow color to a gray scale.

When the operating system is started the video display adapter is initialized by another operating system subsystem "USER" 33. USER provides functions relating to the GUI, including functions to create, move, size, and remove screen objects such as display windows, selection menus appearing in the display windows, graphical icons, and the like. For example, an application program can call a USER function to remove a display window associated with the application program. USER also controls other resources such as a sound driver, a timer, and communications ports. In addition, end-user input from a mouse, a keyboard, or other input device is directed by USER to an application program.

In some of the Windows® operating system products (e.g., Windows® 95), USER is able to interact directly with the adapter's device driver. In those systems, USER employs the device driver to provide cursor support directly, i.e., the device driver makes directly available certain functions relating to displaying a mouse pointer (cursor). These functions include "CheckCursor( )" for drawing the cursor if drawing is not disabled, "InquireCursor( )" for retrieving information about the cursor, "MoveCursor( )" for moving the cursor to a specified position on the screen, and "SetCursor( )" for setting the cursor's shape. In other Windows® operating system products (e.g., Windows® NT), USER does not communicate directly with the adapter's device driver but rather communicates with NT's equivalent of GDI (referred to as "GRE" for "graphics engine"), which in turn communicates with the device driver.

When the Windows® 95 operating system first starts (at "boot-time"), USER calls the InquireCursor( ) function to retrieve information about the cursor. USER then sets a system timer to call the CheckCursor( ) function on each timer interrupt (i.e., at predetermined intervals) and starts a mouse-related device driver. As a result, whenever it is moved by the end-user, the mouse generates an event (e.g., a hardware-based, asynchronous interrupt) causing the operating system to call MoveCursor( ) to re-display the cursor image at the screen location designated by the end-user. USER and application programs subsequently set the shape of the cursor using SetCursor( ). In this example, because USER calls MoveCursor( ) at the occurrence of each mouse move event, MoveCursor( ) sets a flag with a non-interruptable instruction (e.g., "bts") to prevent the MoveCursor( ) function from being called again before completing processing of a current call. Once the flag is set, MoveCursor( ) determines a new position (i.e., the x and y coordinates) and draws the cursor in the new position. When finished, MoveCursor( ) clears the flag with another non-interruptable instruction. Meanwhile, the CheckCursor( ) function is called at each timer interrupt to determine whether the cursor should be redrawn and whether drawing is enabled. If so, the function redraws the cursor.

Windows® NT does not use interrupts for performing cursor display and management functions but rather uses asynchronous procedure calls ("APCs")—an alternative mechanism for handling events. An APC is a function that executes asynchronously in the context of a particular thread. Whenever the mouse is moved or otherwise manipulated by the end-user, an APC is queued for a thread dedicated to input handling. When this thread next runs, it executes the functions specified by the APCs in its queue. The dedicated input thread runs concurrently with any active applications and performs essentially the same functions for managing the cursor as described above with respect to the interrupt-based event handling mechanism.

Once a device context has been initialized, USER queries the device for several of its characteristics and capabilities so as to properly maintain the desktop. Initializing the device context provides USER with information about icons, key and mouse cursors, and bitmap resources for defining the appearance of other screen objects such as graphical buttons controlling the presence of a display window. After it has been initialized by USER, the device context remains fairly stable for the duration of the Windows® session, i.e., until the operating system is restarted for some reason.

In Windows® 95 and in Windows® NT, USER supports reconfiguring the dimensions of the monitor space (i.e., the logical width and height of the screen) during the Windows® session. The logical width and height are measured in picture elements ("pixels") organized in a raster grid. A pixel refers to the smallest unit of the screen addressable via the screen memory and is usually represented in the screen memory by multiple bits representing the state of one or more characteristics (e.g., color) of the pixel. For example, the color of the pixel may be represented by 24 bits, i.e., a pixel's color may have a "bit-depth" of 24. In the case of a computer monitor employing cathode-ray tube ("CRT") technology, a pixel corresponds to a phosphor dot or a set of phosphor dots configured to illuminate when struck by one or more beams emanating from an electron gun.

Changing the logical height and width of the screen during a Windows® session is accomplished by instructing the device driver to direct the video display adapter to re-initialize itself with the new height and width. Assuming the adapter is capable of such a re-initialization, USER subsequently queries the adapter for its capabilities and updates its internal information about the adapter. USER also updates the positions on the screen of any of the desktop's display windows that are affected by the change. Typically, like the size of the screen, the size of a display window is measured in pixels. Thus, for example, if a screen originally having a size (i.e., resolution) of 1024 (width) by 768 (height) pixels is changed to a resolution of 640 by 480 pixels, one or more display windows that were originally completely visible may lie partially or completely offscreen after the change. Also, as a result of the change in resolution, a window originally sized to cover a considerable portion of the desktop may no longer fit on the screen. USER repositions any such windows, first by attempting to move those windows horizontally or vertically or both, and then, if unsuccessful, by resizing the windows to fit within the available desktop space.

Figure 6:
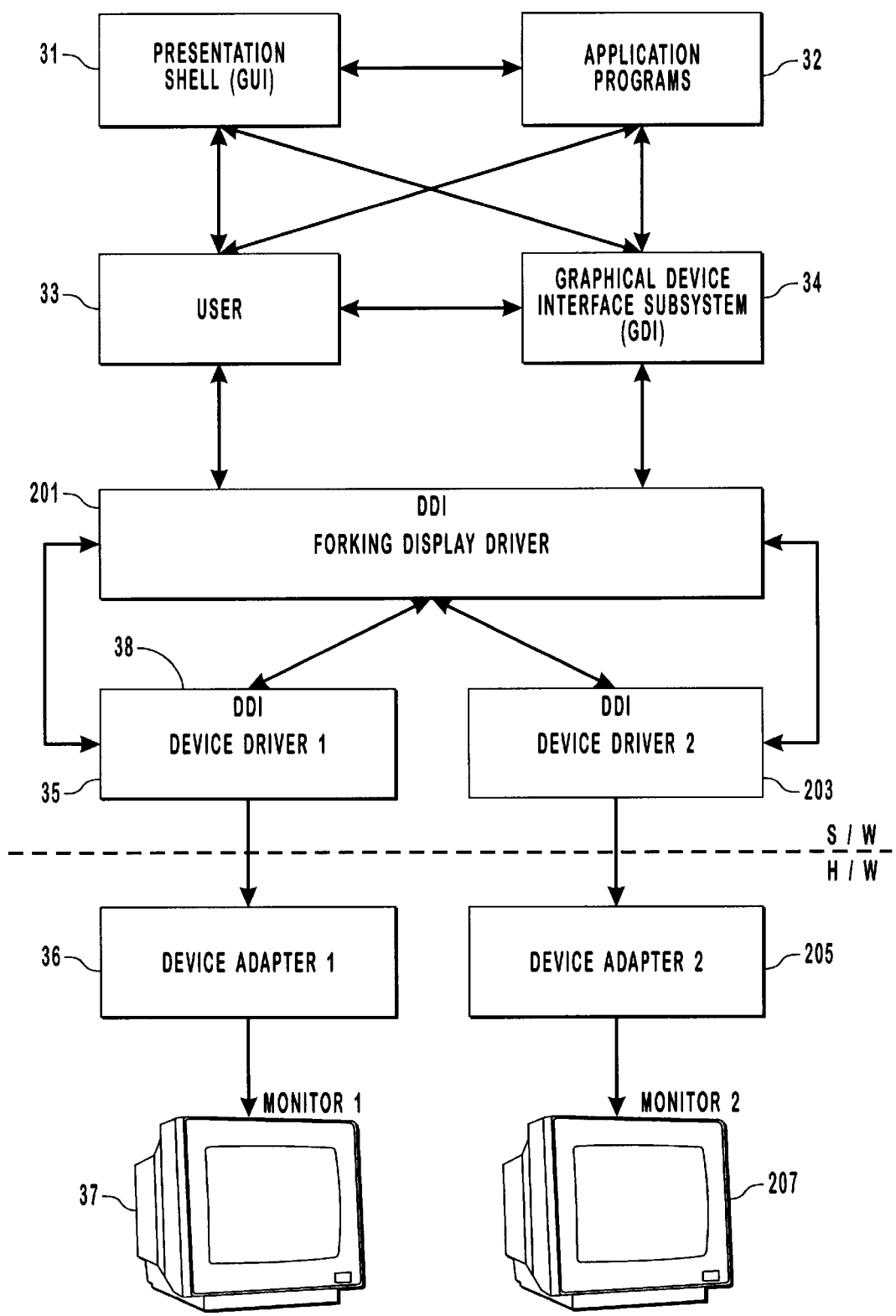
FIG. 6 is a multiple monitor display architecture block diagram for the computer of FIG. 3.

FIG. 6 illustrates a multiple monitor display architecture that may be used which includes two device drivers 35, 203 and two monitors 37, 207. The multiple monitor architecture is similar to the single monitor display architecture except that it also includes a Forking Display Driver 201—a piece of software code that may be dynamically inserted or removed when a second monitor is installed or removed accordingly. The forking display driver effectively splits the graphics stream from the GDI into a number of parts equal to the number of monitors being used (e.g., two parts for two monitors) and thus distributes the virtual desktop across multiple monitors. Details on the forking driver may be found in commonly-assigned U.S. Ser. No. 08/786,971 filed Jan. 24, 1997, entitled "ALLOCATING DISPLAY INFORMATION," which was filed concurrently with this application and is incorporated by reference.

As noted above, the USER code is responsible for, among other things, the manner in which the desktop and various graphic objects (e.g., windows, menus, dialog boxes, the cursor and the like) are displayed to the end-user. When the end-user enters input via the mouse or keyboard that is intended to affect the display (e.g., cursor movement, window repositioning or resizing), it is USER's job to respond to that input by changing the display in a robust manner—i.e., in a manner that accurately reflects the end-user's intentions and which does not surprise, confuse or frustrate the end-user in interacting with the GUI. A robust multiple monitor GUI is described in commonly-assigned U.S. Ser. No. 08/786,969 filed Jan. 27, 1997, entitled "ROBUST DISPLAY MANAGEMENT IN A MULTIPLE MONITOR ENVIRONMENT," which was filed concurrently with this application and is incorporated by reference.

USER's responsibilities further include providing the end-user with a continuous display space (e.g., virtual desktop) regardless of the number of monitors (one or more) from which the display space is composed. This task is relatively straightforward in a single monitor environment because a single monitor is, by definition, a continuous display space. Performing this task in a multiple monitor environment poses several challenges that were not present in the single monitor environment.

Accordingly, in one embodiment, USER dynamically manages the configuration of multiple monitors in logical space such that an end-user is presented with a continuous display space that spans two or more monitors. This continuous display space behaves and responds to the end-user essentially in the same manner as if a single monitor were being used. USER accomplishes this robust management through program code specifically designed for the multiple monitor environment. The specialized program code (the "reconfiguration code") logically can be divided into two broad categories: (1) program code that arranges the component monitor spaces such that they form a contiguous, non-overlapping display space at boot-time, and whenever the display space undergoes a geometry change; and (2) program code that, following a display space geometry change, manages (e.g., relocates or resizes) windows or other display regions such that they are displayed and behave in a logical manner that averts end-user astonishment.

Figure 7A:
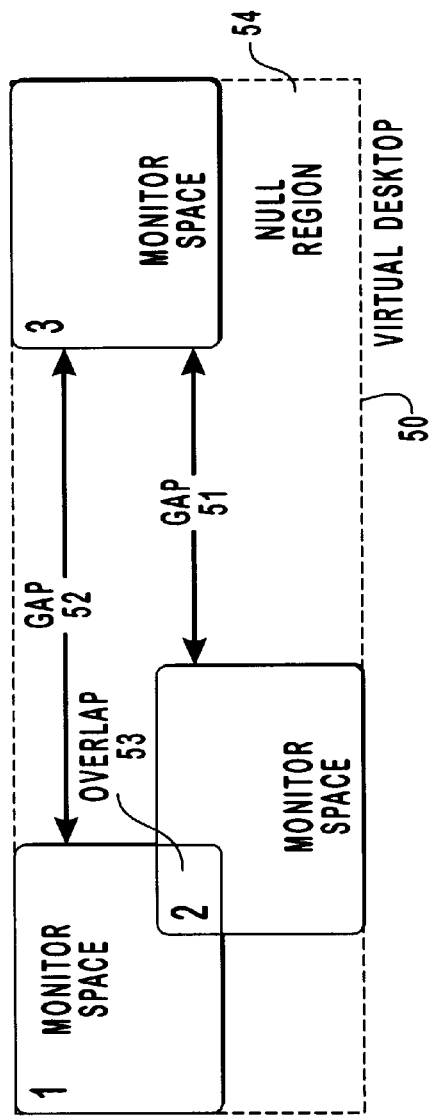
FIGS. 7(a) and 7(b) are monitor space diagrams showing examples of an overlapping, non-contiguous desktop and a non-overlapping, contiguous desktop, respectively, using three monitors.

When the operating system boots in a multiple monitor environment, the component monitors are initialized at indeterminate locations in logical space. Most likely, the relative positions of the monitors in logical space will be such that overlaps and/or gaps between monitors will exist. As shown in FIG. 7(a), for example, a three monitor system might initialize itself such that an overlap 53 exists between monitor space 1 and monitor space 2 and gaps 51 and 52 exist between monitor space 3 and monitor spaces 1 and 2, respectively. Note we are referring here to the logical monitor space. The monitors themselves would of course be physically separate, incapable of overlap. An end-user working with an aggregate display space (a virtual desktop 50 composed of the union of monitor spaces 1, 2 and 3 as they are arranged in FIG. 7(a)) quickly would become frustrated and confused by interacting with the GUI while seeing a different physical geometry. For example, if the end-user moved a graphic object (e.g., cursor image or window) into overlap region 53, logically a dual image of the object should appear simultaneously on monitors 1 and 2 because the object is present in both monitor spaces. No such dual image is generated in practice, however, because to do so would pose substantial technical difficulties and would provide little, if any, corresponding benefit to the end-user. To the contrary, a dual image display more likely would confuse the end-user.

On the other hand if the end-user moved an object from monitor space 1 to the right into null region 54, the object would become invisible to the end-user (i.e., displayed on neither monitor) and potentially irretrievable.

Figure 7B:
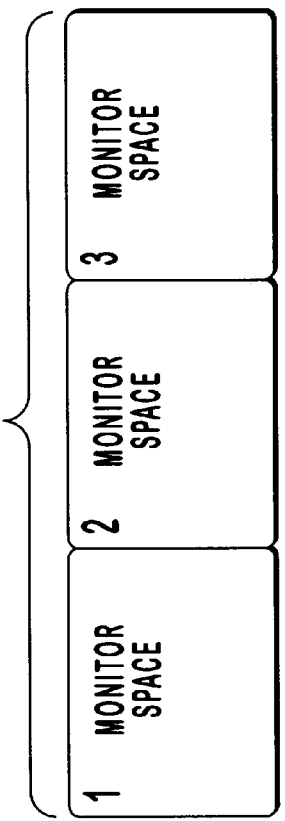

Accordingly, USER prevents these problems by automatically arranging the monitor spaces relative to each other in logical space to form a contiguous, non-overlapping region as shown in FIG. 7(b). As a result, the end-user is presented with a continuous virtual desktop 50 that is devoid of overlaps and gaps, and which behaves in a robust manner—i.e., essentially in the same manner as if the virtual desktop 50 was within a single monitor space. Moreover, requiring the virtual desktop to be contiguous and non-overlapping allows other sections of the display architecture program code to operate faster and more efficiently while in multiple monitor mode. For example, the USER program code that is responsible for ensuring that the cursor image display always remains visible on exactly one monitor in a multiple monitor environment can perform its calculation more quickly as a result of the simplified geometry that arises from the non-overlap and contiguity requirements. The forking display driver code also is enabled to run more efficiently by imposing these requirements on the virtual desktop.

In addition to boot-time, USER dynamically arranges the monitor spaces in response to certain run-time conditions—namely, whenever the aggregate display space undergoes a "geometry change," which is a change in the size or shape or orientation of the aggregate display space. A geometry change generally falls into one of the seven situations shown in FIGS. 8(a) through 8(g).

Figure 8A:
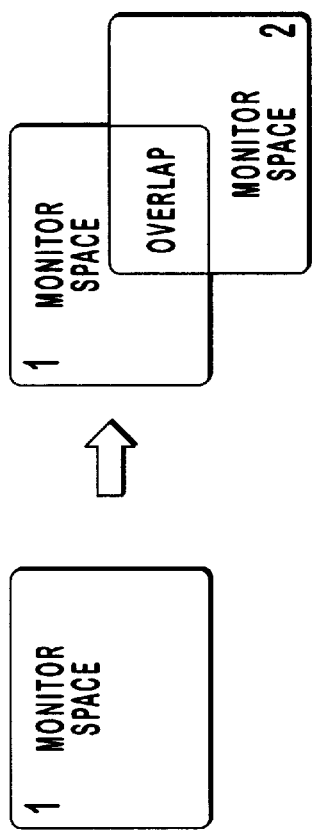
FIGS. 8(a)–8(g) are monitor space diagrams showing examples of monitor space geometry changes and changes in the number of monitors.
Figure 8B:
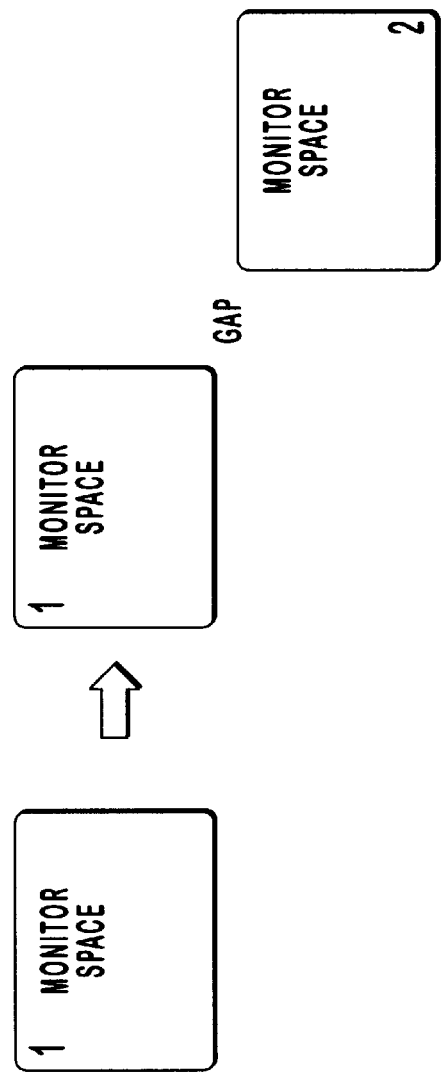

In FIGS. 8(a) and 8(b), a geometry change occurs when an end-user turns on or otherwise activates an additional monitor beyond the monitor (or monitors) already present in the configuration. Just as with the initialization of monitors at boot-time, a monitor added during run time will initialize such that the origin of its monitor space is at an indeterminate location in logical space. Consequently, a newly added monitor space could overlap with an existing monitor space (FIG. 8(a)) or could be positioned such that a gap exists between the added monitor space and the preexisting monitor space(s) (FIG. 8(b)). In either case, the reconfiguration code will automatically restore the virtual desktop to a contiguous, non-overlapping region.

Figure 8C:
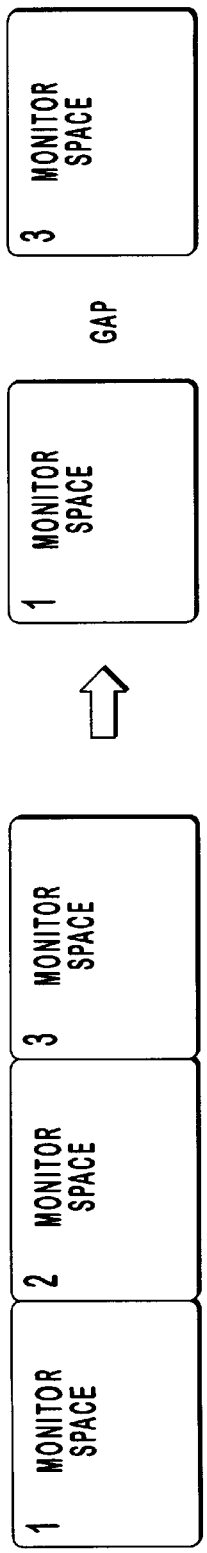
Figure 8D:
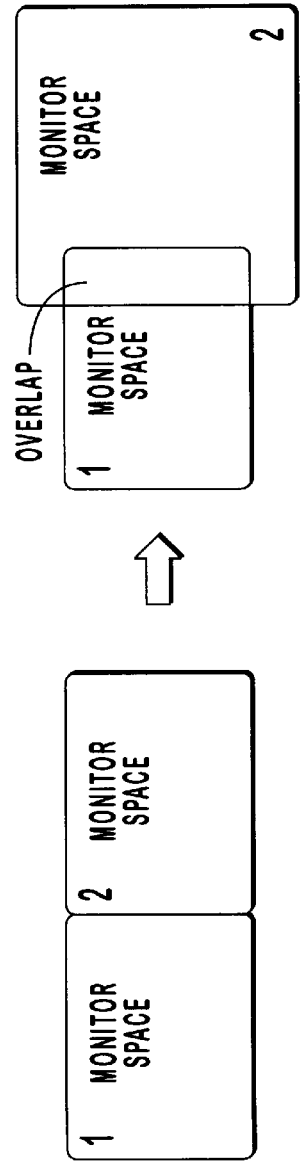
Figure 8E:
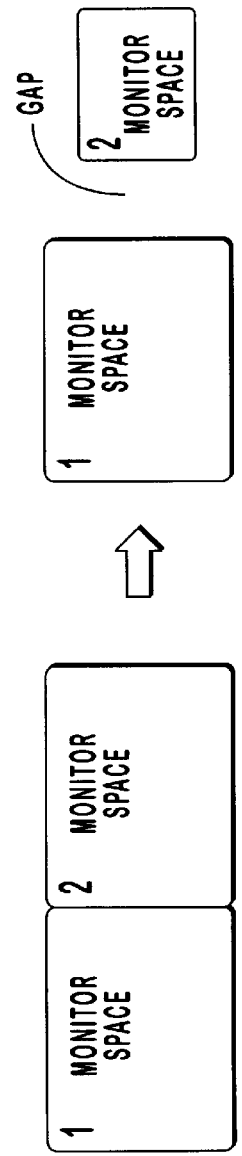

Similarly, a geometry change occurs whenever an existing monitor space is turned off or otherwise deactivated. As shown in FIG. 8(c), the removal of monitor space 2 from the aggregate display space creates a gap between monitor spaces 1 and 3, a condition that will be corrected by the reconfiguration code by moving monitor spaces 1 and 3 together in logical space such that they have adjacent borders.

Figure 9A:
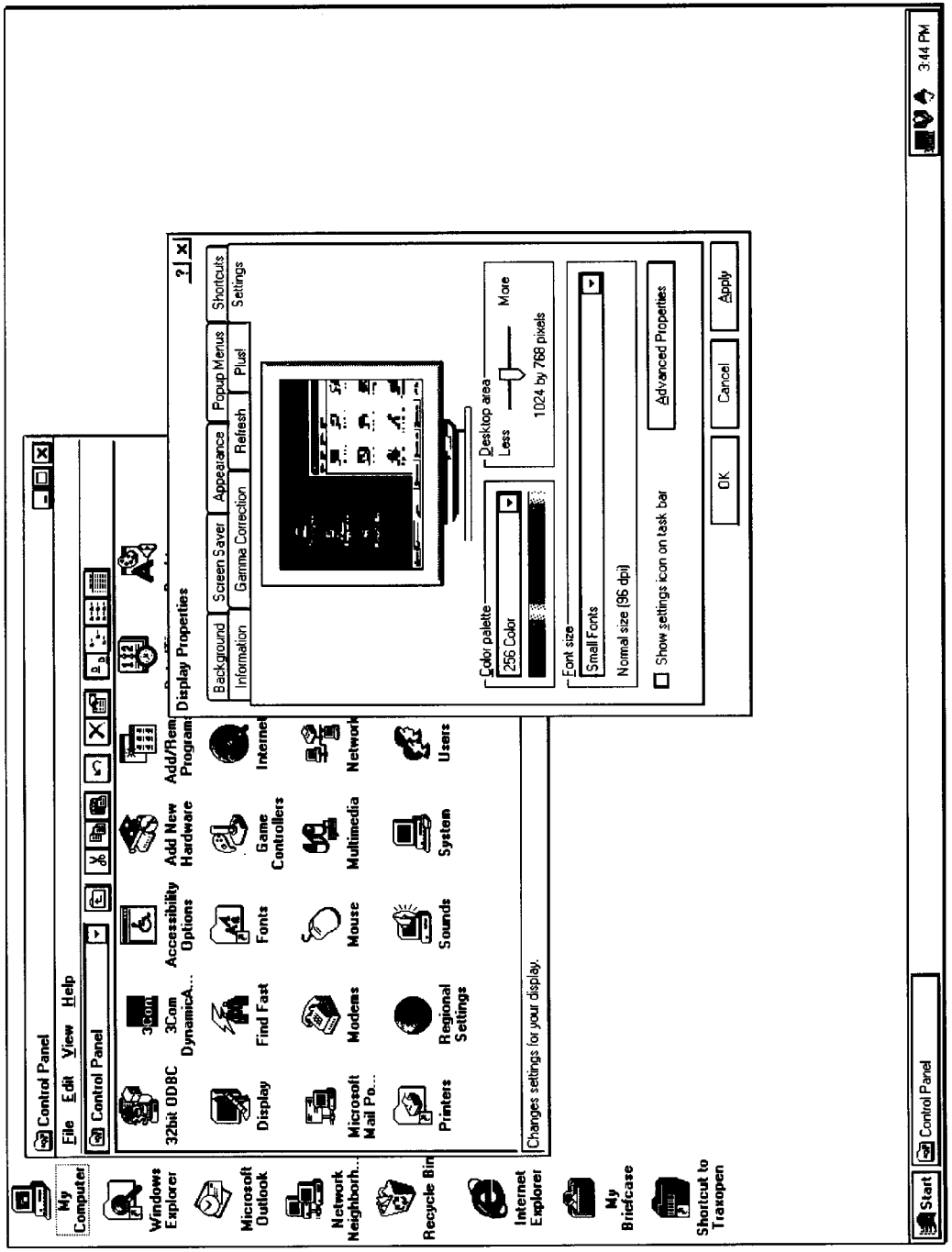
FIG. 9(a) is a screen snapshot of a 1024×768 pixel desktop which includes a window that allows an end-user to change desktop area.
Figure 9B:
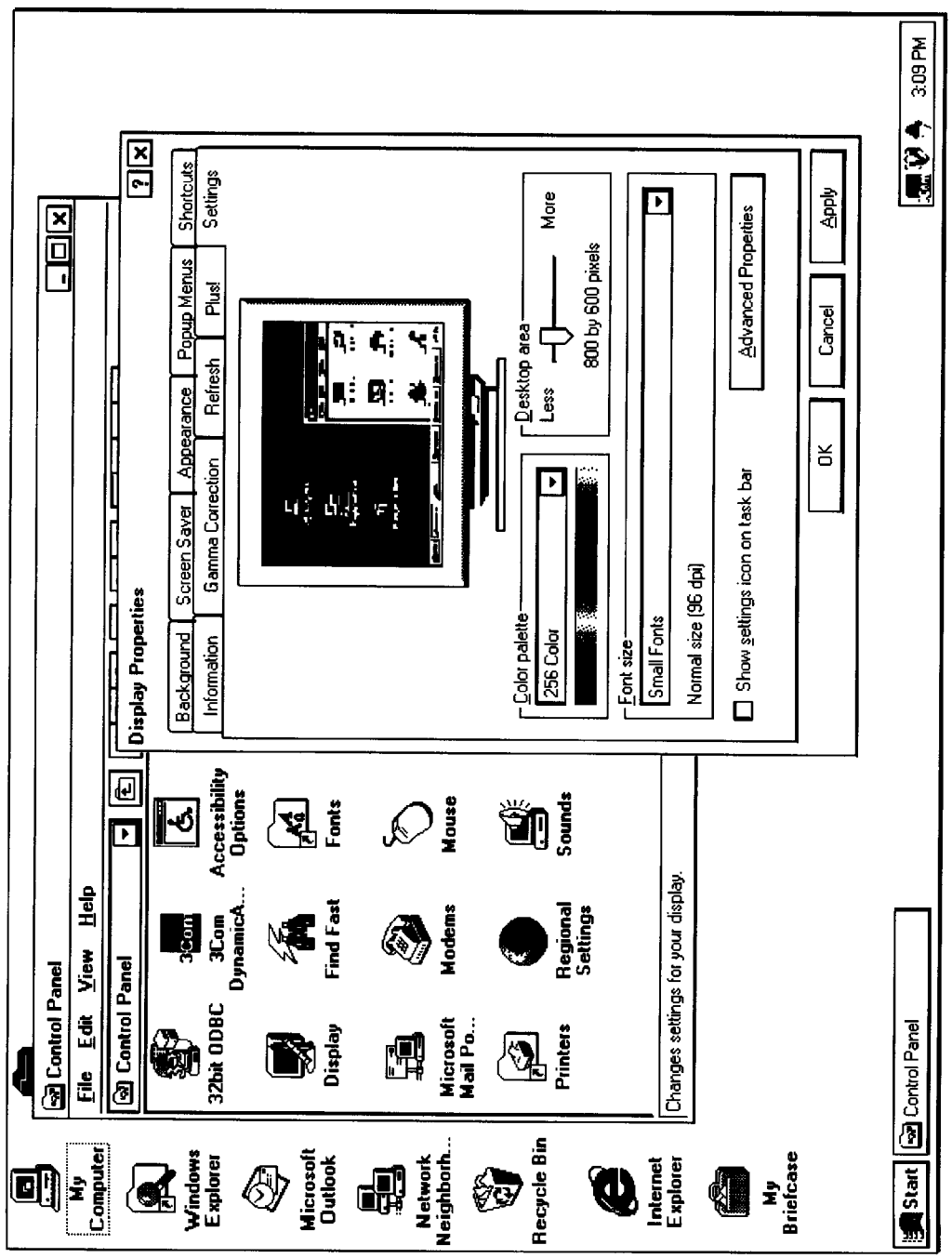
FIG. 9(b) is a screen snapshot of an 800×600 pixel desktop for the same scene shown in FIG. 9(a).

Geometry changes also may occur when certain characteristics of a monitor are changed. For example, an end-user may change the size of a monitor space as desired (using a special purpose GUI window such as shown in FIGS. 9(a) and 9(b)) so that it becomes larger (e.g., 1024×768 pixels as shown in FIG. 9(a)), thereby causing it to overlap another monitor space (FIG. 8(d)), or smaller (e.g., 800×600 pixels as shown in FIG. 9(b)), thereby causing a gap between the monitor spaces (FIG. 8(e)). In either case, the reconfiguration code dynamically restores the aggregate desktop to a contiguous, non-overlapping state using the process represented by FIGS. 11(a)–11(c).

Figure 11A:
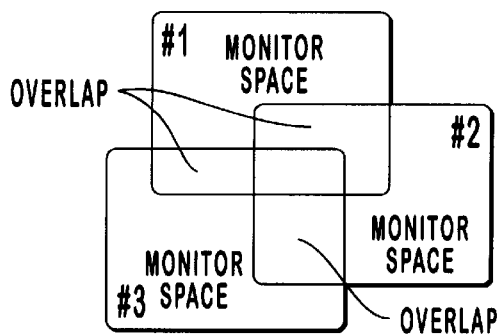
FIGS. 11(a)–11(c) are screen diagrams showing successive representations of three monitors as they are repositioned in logical space to form a contiguous, non-overlapping region.
Figure 11B:
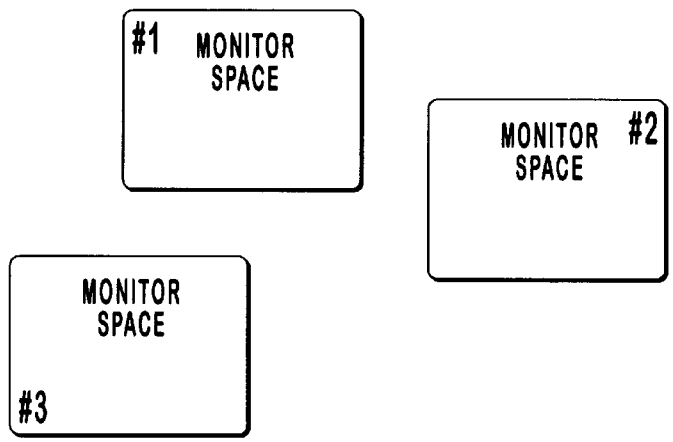
Figure 11C:
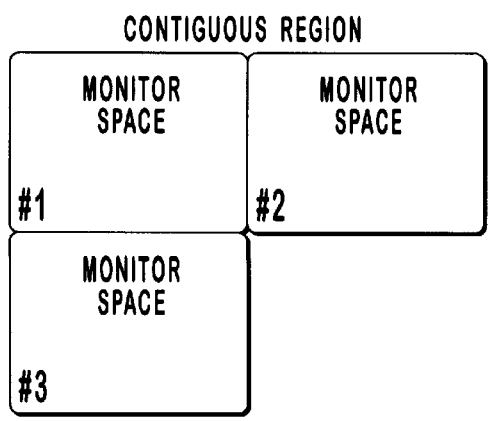

FIGS. 11(a)–11(c) illustrate the basic concept employed by the reconfiguration code to enforce a contiguous, non-overlapping desktop. In FIG. 11(a), monitor spaces 1, 2 and 3 have been initialized at boot-time in indeterminate states such that their respective monitor spaces overlap one another. The reconfiguration code's first step in eliminating overlaps is to detect the presence of an overlap between any two monitor spaces. If an overlap is found, one of the monitor spaces is moved outward in logical space until the detected overlap is eliminated. This process of detecting and resolving overlaps is repeated until no two monitor spaces occupy the same logical space as shown in FIG. 11(b). Once the monitor spaces have been spread out and no more overlaps remain, the reconfiguration code then packs them back in until they form a contiguous region as shown in FIG. 11(c). The process of FIGS. 11(a)–11(c) is described in more detail with reference to the flowcharts of FIGS. 12(a) and 12(b). By combining the two processes represented in FIGS. 12(a) and 12(b), USER can take an arbitrarily positioned set of monitor spaces and reorganize them to form a non-overlapping, contiguous virtual desktop.

Figure 12A:
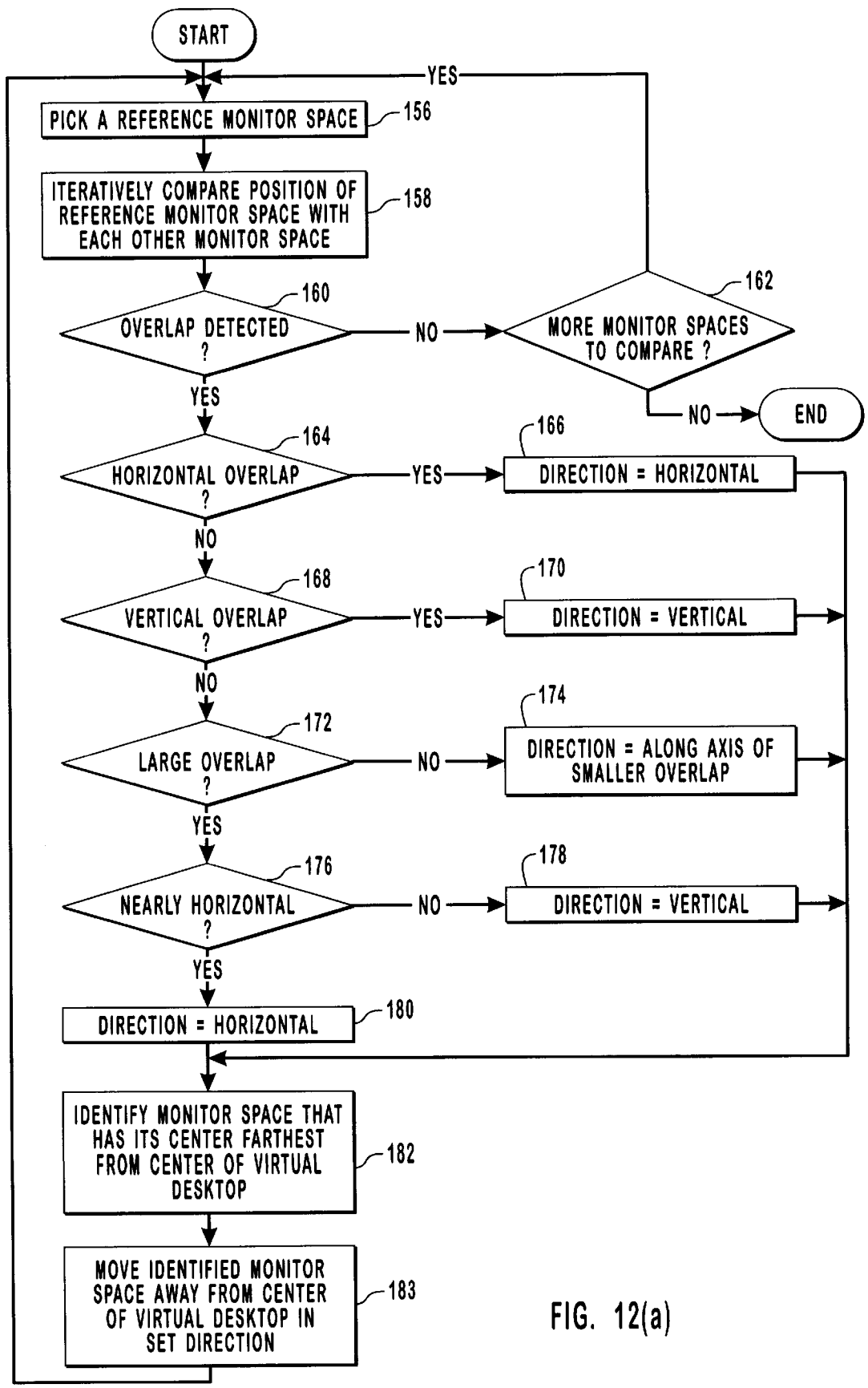
FIG. 12(a) is a flowchart for removing overlaps between monitor spaces.

FIG. 12(a) is a flowchart of the steps taken by the reconfiguration code to remove overlaps between monitor spaces. Every monitor space is compared against every other monitor space, and appropriate repositioning of monitor spaces is performed until no two monitor spaces overlap each other. A portion of the program instructions used by the reconfiguration code to remove overlaps is attached as Appendix A, and is incorporated by reference.

The first step 156 is to pick a reference monitor space, which at the start of the overlap removal process is chosen arbitrarily. At step 158, the reference monitor space is then iteratively compared with every other monitor space looking for an overlap. If at step 160, it is determined that the reference monitor space does not overlap any other monitor space, the reconfiguration code determines at step 162 whether all of the monitor spaces have been so tested. If not, the process returns to step 156 to pick another reference monitor space, which in turn will be compared against every other monitor space to check for overlaps.

The first instance in which an overlap between the reference monitor space and another monitor space is detected at step 160, the reconfiguration code proceeds to determine the "type" of overlap that has been encountered. FIGS. 13(a)–13(i) show nine types of overlaps recognized by the reconfiguration code.

Figure 13B:
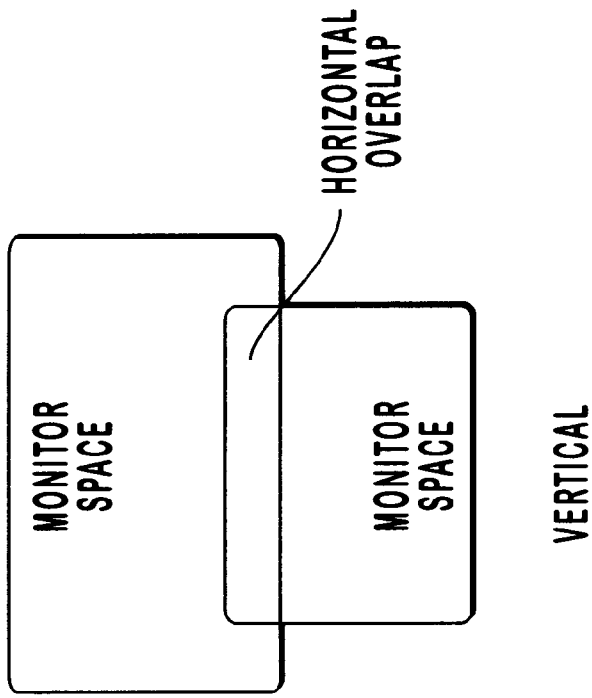
Figure 13A:
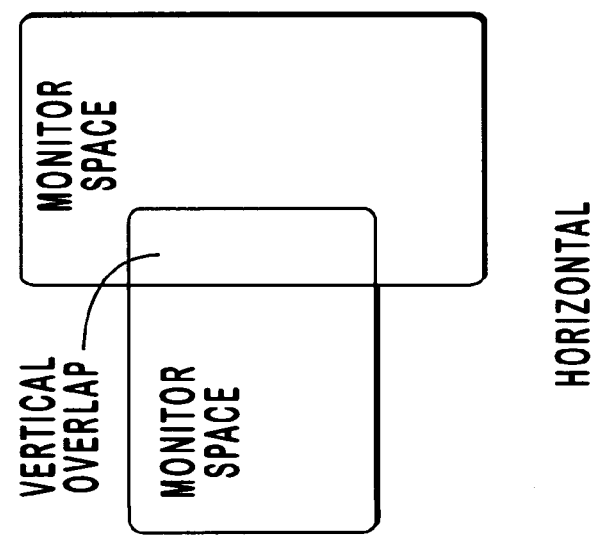
Figure 13E:
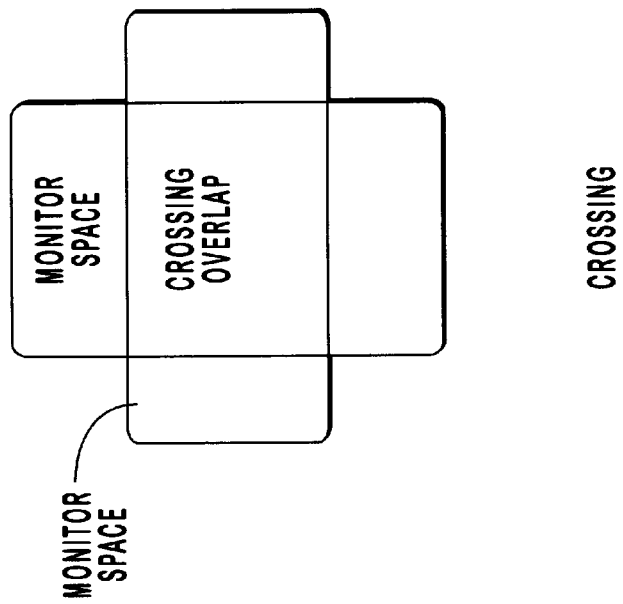

At steps 164 and 168, it is determined whether the detected overlap is "horizontal" in nature (FIG. 13(a)) or "vertical" in nature (FIG. 13(b)) or neither of the two. A horizontal overlap exists if the upper and lower boundaries of one of the monitor spaces fall on or within the vertical range defined by the upper and lower boundaries of the other monitor space. Similarly, a vertical overlap exists if the right and left boundaries of one of the monitor spaces fall on or within the horizontal range defined by the left and right boundaries of the other monitor space. If the overlap is determined to be horizontal then the direction of separation is set to be horizontal in step 166. If the overlap is determined to be vertical then the direction of separation is set to be vertical in step 170.

Steps 164 and 168 represent a quick check that is performed by the reconfiguration code to identify whether the overlap is one of the two most common overlap cases, namely the horizontal overlap of FIG. 13(a) or the vertical overlap of FIG. 13(b). Although this check is represented as two separate steps in FIG. 12(a), in fact the reconfiguration code is able to determine, in a very short time, the presence or absence of either condition based on the value returned by the function INTERSECTION_AXIS(a, b) (defined in Appendix A), where a is one of the monitor spaces under consideration and b is the intersection of the two overlapping monitor spaces.

Figure 13D:
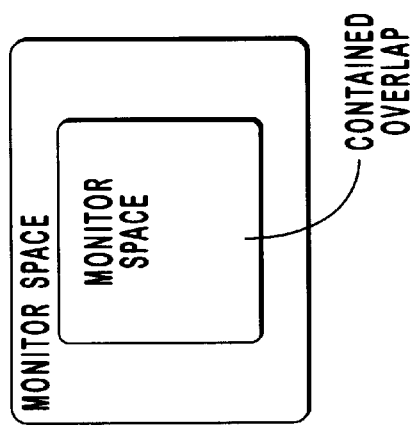
Figure 13C:
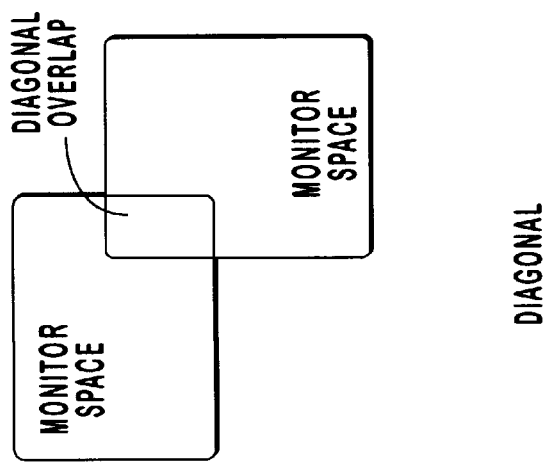

If INTERSECTION_AXIS( ) returns a value of 0, the overlap is vertical, and a return value of 1 means the overlap is horizontal. If INTERSECTION_AXIS( ) returns any value other than 0 or 1, it means that the type of overlap is "unknown"—i.e., it is neither horizontal nor vertical, as defined above. An unknown overlap is more difficult to resolve and typically falls into one of the following types: FIG. 13(c) in which the monitor spaces are diagonal to one another; FIG. 13(d) in which one monitor space is contained in the other monitor space; or FIG. 13(e) in which the monitor spaces cross each other.

If the overlap satisfies the requirements neither of step 164 nor step 168, the reconfiguration code proceeds to step 172 to determine whether the overlap is "large" or "small." A large overlap exists where one monitor space contains the center of the other monitor space as shown in FIG. 13(f). Otherwise, the overlap is regarded as small, for example, as shown in FIG. 13(g). If the detected overlap is found to be small, the direction of separation is set in step 174 to be in the direction (horizontal or vertical) of the smaller overlap distance. In FIG. 13(g), for example, the horizontal overlap distance 84 is smaller than the vertical overlap distance 86. Accordingly, for the overlap of FIG. 13(g), the direction of separation would be set to horizontal.

Figure 13I:
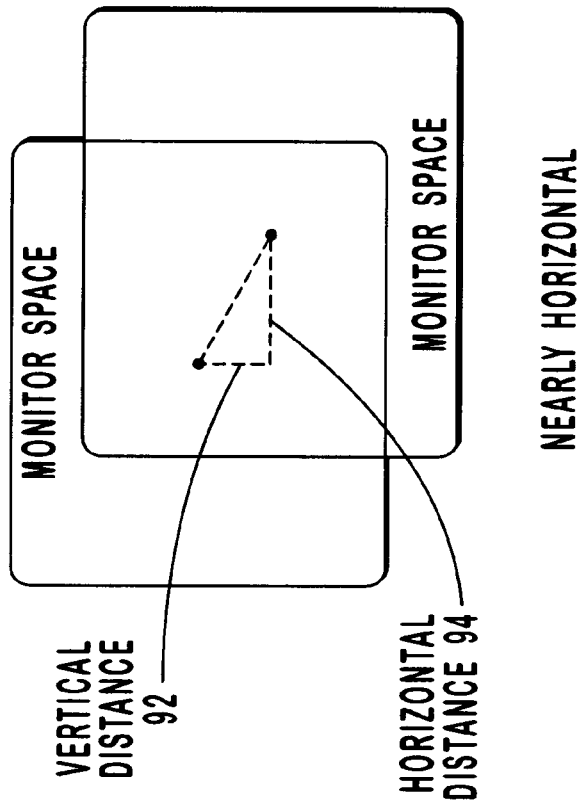
Figure 13H:
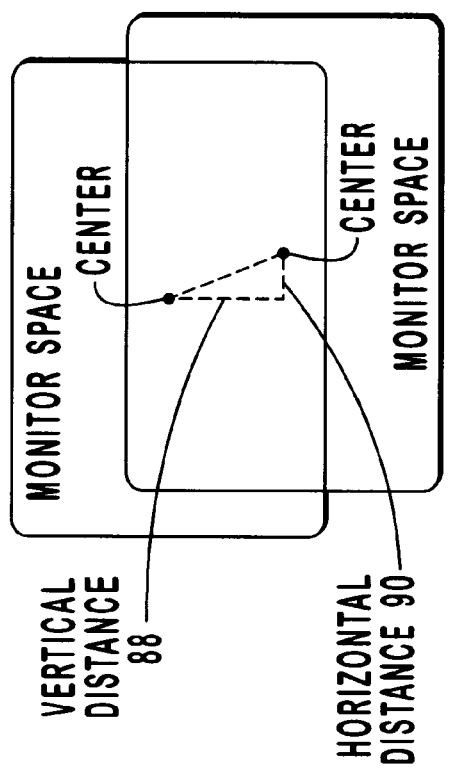

If, however, the detected overlap is found to be large, the reconfiguration code proceeds to step 176 to determine whether the monitor spaces under consideration are closer to being vertically aligned ("nearly vertical") or horizontally aligned ("nearly horizontal"). As shown in FIG. 13(h), a nearly vertical alignment exists if the vertical distance 88 between the centers of the two monitor spaces is greater than the horizontal distance 90 between the centers. A nearly horizontal alignment exists if the horizontal distance 94 between the centers of the two monitor spaces is greater than the vertical distance 92 between the centers, as shown in FIG. 13(i). If at step 176 the detected overlap is determined to be nearly horizontal then the separation direction is set to be horizontal at step 180. If, on the other hand, the detected overlap is determined to be nearly vertical, the separation direction is set to be vertical at step 178.

Once the direction of separation has been set appropriately, the reconfiguration code determines at step 182 which of the two monitor spaces under consideration will be moved to eliminate the overlap. The monitor space that will be moved is the one whose center is farthest from the center of the virtual desktop. At step 183, the monitor space identified in step 182 is moved away from the center of the virtual desktop in the direction set in one of steps 166, 170, 174, 178 and 180.

Several benefits arise as a result of the particular decisional criteria used in step 182 (move monitor space farthest from desktop's center) and step 183 (move monitor space outward). For instance, always moving monitor spaces outward to eliminate overlaps lessens the likelihood that that monitor will be moved into a position that overlaps another monitor space. If it does, that overlap will be resolved by moving one of the overlapping monitor spaces still farther out. This guarantees that a non-overlapping solution eventually will be found. From the perspective of the end-user, the decisional criteria used in steps 182 and 183 use as much of the available logical space as needed and thus tend to minimize the number of monitor moves that are necessary to reach a non-overlapping solution. By keeping the convolution of the monitor space layout to a minimum, the criteria used in steps 182 and 183 reduces the potential for end-user confusion. In contrast, overlap-removal criteria that allowed inward moves, or which otherwise tended to disfavor outward moves, necessarily would be more complex and thus would require a greater number of moves to reach a non-overlapping solution.

After the overlap between the present two monitor spaces is eliminated in step 183, the reconfiguration code returns to step 156 to continue its search for overlaps. This time around the reconfiguration code selects as the reference monitor space in step 156 the same monitor space that was just moved in step 183. This process continues until it is determined at steps 160 and 162 that no two monitor spaces overlap.

Once the various monitor spaces have been spread out such that no two overlap, the reconfiguration code pulls the monitor spaces back together so that they form a contiguous region, which is defined as a region in which each monitor space "touches" any other monitor space in the group. A monitor space touches another monitor space if it has one edge that is at least partially coincident with an edge of the other monitor. Accordingly, each of FIGS. 14(a)–14(d) is an example of a contiguous desktop because each monitor space shares at least a portion of one of its edges with another monitor space within its group.

Figure 12B:
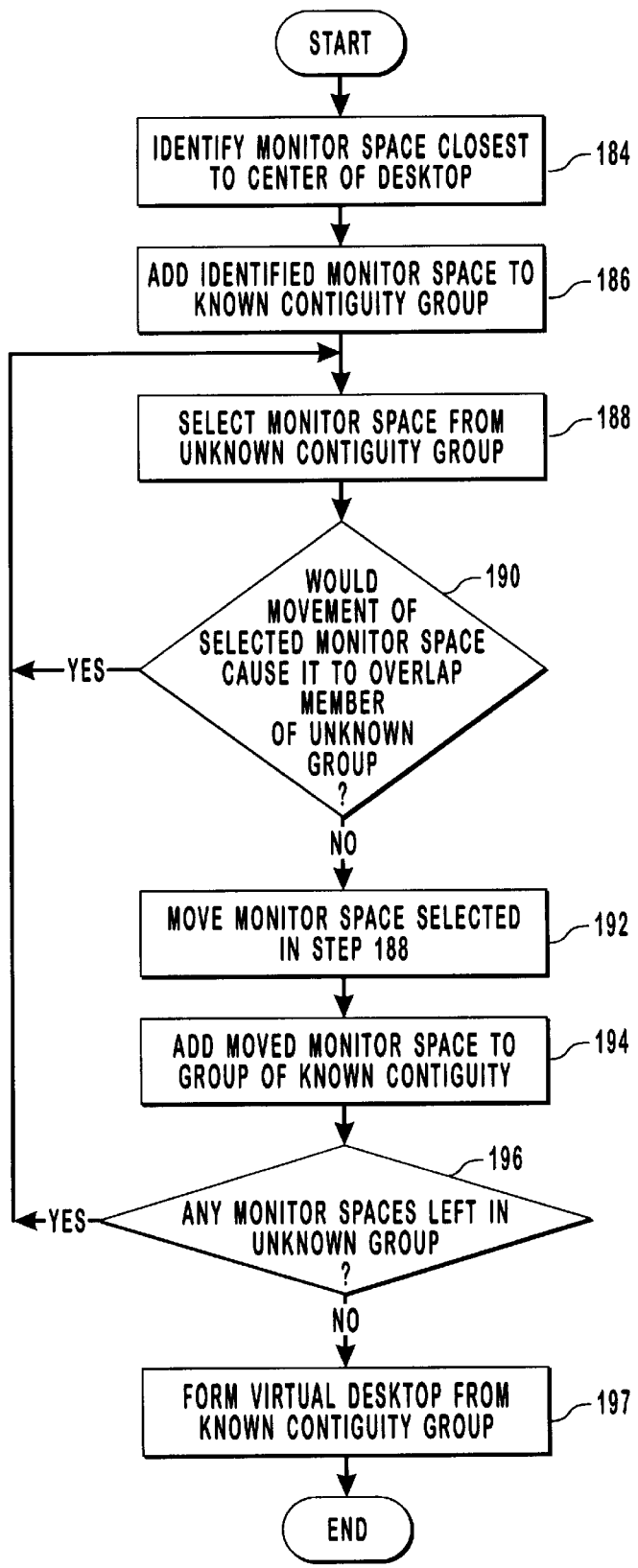
FIG. 12(b) is a flowchart for removing gaps between monitor spaces.

FIG. 12(b) is a flowchart of the steps taken by the reconfiguration code to pull monitor spaces together to form a contiguous desktop. The first step 184 is to identify a monitor space that should serve as the starting point for the process. The particular monitor space identified in step 184 is the monitor space that is closest to the center of the virtual desktop. The position of the starting monitor space will not change during the process of creating a contiguous desktop. Rather, the other monitor spaces will be moved relative to the starting monitor space as needed. This has the effect of closing gaps between monitor spaces by pulling the monitor spaces inward towards the starting monitor space, which by definition is at or near the center of the desktop. As a result of this inward motion, the monitor spaces are less likely to be pulled apart (which would otherwise cause new gaps to appear). This in turn reduces the potential for end-user confusion as convolution of the monitor space layout is kept to a minimum.

Once the starting monitor space has been identified, it is added (logically speaking) to a group of "known contiguity" at step 186. At this point, all of the other monitor spaces are regarded as belonging to a group of "unknown contiguity." At step 188, a monitor space is chosen from the unknown contiguity group. The particular monitor space chosen is the one that is closest to any one of the monitor spaces belonging to the known contiguity group, which at this point has just one member—the starting monitor space identified in step 184.

Before any monitor space is moved, however, the reconfiguration code checks at step 190 to see if moving the selected monitor space to a position where it would touch one of the members in the known contiguity group would at the same time cause it to overlap another monitor space belonging to the unknown contiguity group. If such an overlap would result, the selected monitor space is ignored for the time being and a different monitor space is selected from the unknown contiguity group. This process continues until a suitable monitor space is identified in the unknown contiguity group.

At this point in the desktop reconfiguration code, all overlaps previously have been eliminated as described above in connection with the flowchart of FIG. 12(a). Step 190 ensures that no new overlaps are created during the process of removing gaps. If monitor space moves were allowed during gap elimination such that new overlaps could be created, it potentially could undo the previous overlap elimination, thus preventing a contiguous, non-overlapping solution from being achieved.

At step 192 the monitor space selected from the unknown contiguity group is moved so that it touches at least one of the monitor spaces in the known contiguity group. Horizontal or vertical movement is favored over diagonal movement because it produces good results especially in closing gaps caused by changing the monitor space size (e.g., FIG. 8(e)).

At step 194, the monitor space that was moved in step 192 to touch one of the members in the known contiguity group is removed from the unknown contiguity group and added to the known contiguity group. At step 196, the reconfiguration code checks to see if any monitor spaces remain in the unknown contiguity group. If unknown contiguity group members remain, the reconfiguration code repeats steps 184–196 until a contiguous virtual desktop is achieved. If none remain, it means that the virtual desktop has been formed into a contiguous region.

At step 197, the reconfiguration code forms the virtual desktop from the monitors in the known contiguity group, which at this point includes all of the available monitors. The virtual desktop is formed by finding the union of the various monitors, which by definition is the smallest bounding rectangle that encompasses all of the monitors. The monitors are then repositioned as a group such that the upper left corner of the "primary monitor" is at 0,0 in logical space. The primary monitor was arbitrarily chosen by the operating system at boot-time from among the various monitors that were plugged into the computer system.

In performing the calculations necessary to carry out the processes represented by FIGS. 12(a) and 12(b), the USER reconfiguration code optimizes placement of the monitor spaces forming the non-overlapping, contiguous desktop to enhance the speed with which GDI can use brush objects (logical constructs for drawing on a display) to draw across multiple displays. More particularly, the reconfiguration code ensures that the positions of the monitor spaces (which are assumed to have a resolution that is a multiple of 8 in both the X and Y axes) are constrained in logical space to fall on 8-pixel boundaries. This positioning is accomplished by performing the overlap/gap removal calculations in 8-pixel space (i.e., by dividing the monitor space data sets by 8 before the calculations and then multiplying them by 8 after the calculations are complete). The standard size of a GDI brush object is 8 pixels. To use a brush object, GDI must create a "realization" of the object by mapping, in memory, the logical definition of the brush object into the color lookup table. The realization operation uses processor time and memory. Ordinarily, each window requires its own separate realization of a brush object. Aligning monitor spaces on 8-pixel boundaries, however, allows the same realization of a brush object to be used on each of the monitors that form the desktop, thereby saving memory and enhancing the speed of GDI drawing operations.

As noted above, whenever geometry changes occur such as those in FIGS. 8(a)–8(e) in which the aggregate display space becomes other than a contiguous, non-overlapping region, the USER reconfiguration code, which is continuously executing, automatically enforces the contiguity and non-overlap requirements. Other types of geometry changes may occur—such as those shown in FIGS. 8(f) and 8(g)—that do not cause the virtual desktop to become non-contiguous or overlapping. Nevertheless, the reconfiguration will automatically reconfigure the logical desktop, thereby ensuring that robust end-user interaction is maintained.

Figure 8F:
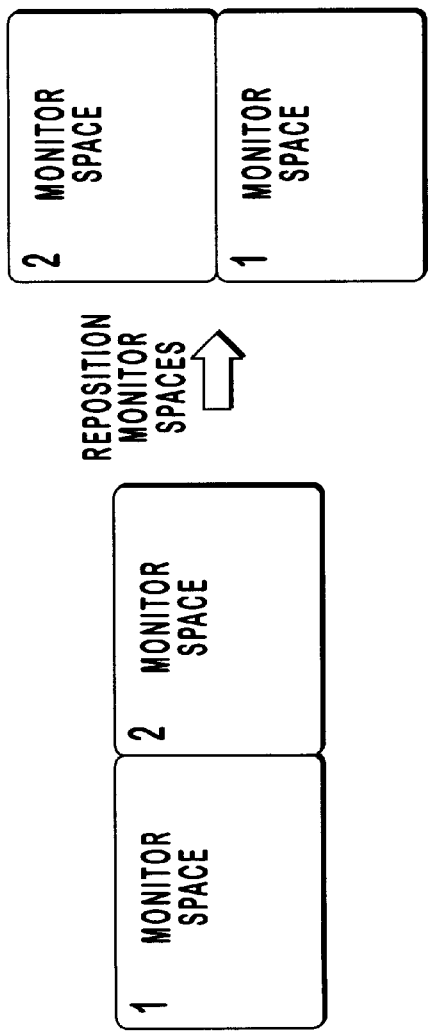
Figure 8G:
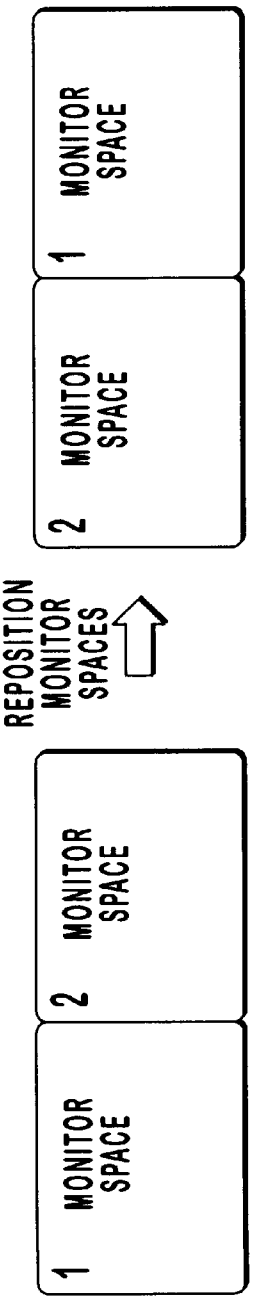
Figure 10A:
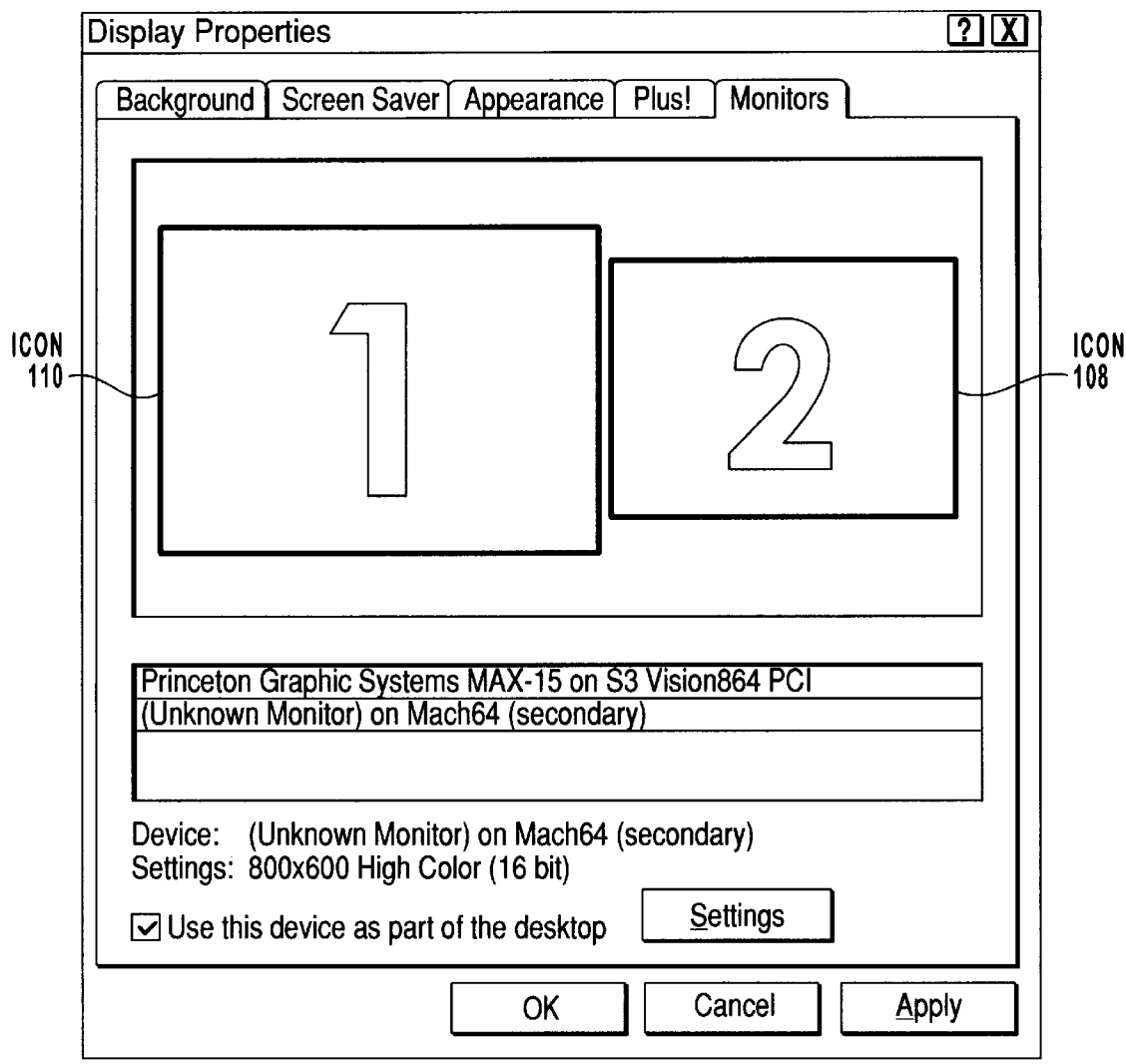
FIGS. 10(a) and 10(b) are screen shots showing a window that allows an end-user to change the logical positions of monitor spaces.
Figure 10B:
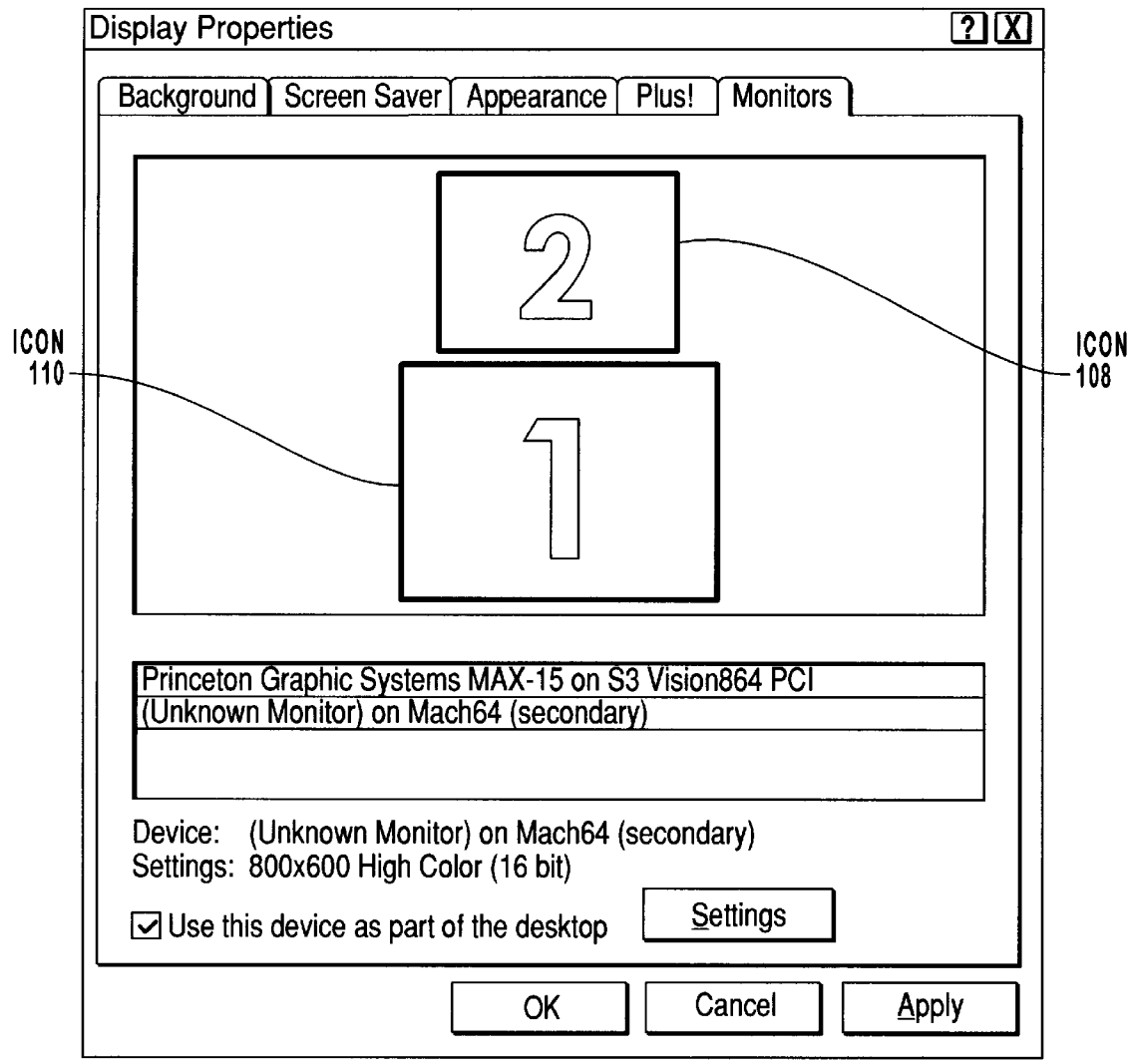

FIGS. 8(f) and 8(g) represent geometry changes that are caused by repositioning one monitor space with respect to another, thus requiring a corresponding repositioning of the monitor. In FIG. 8(f), the monitor spaces have been repositioned such that monitor space 2 sits on top of monitor space 1 and in FIG. 8(g), the positions of monitor spaces 1 and 2 have been swapped. Typically, repositioning of monitor spaces is performed by an end-user (using a special purpose GUI window such as shown in FIGS. 10(a) and 10(b)) so that the relative positions of the logical monitor spaces will mimic the relative positions of the physical monitors. In other words, an end-user may lift one CRT display unit and physically place it on top of another CRT display unit. In the current state of technology, the operating system has no means for automatically sensing that a physical geometry change has occurred, however. Accordingly, following a physical geometry change, the end-user must manually inform the operating system that the monitors have been physically moved relative to one another so that the operating system from that point onward will be able to present and/or manipulate the virtual desktop, and any graphic objects thereon, in a manner that accurately reflects the end-user's intentions.

Figure 15A:
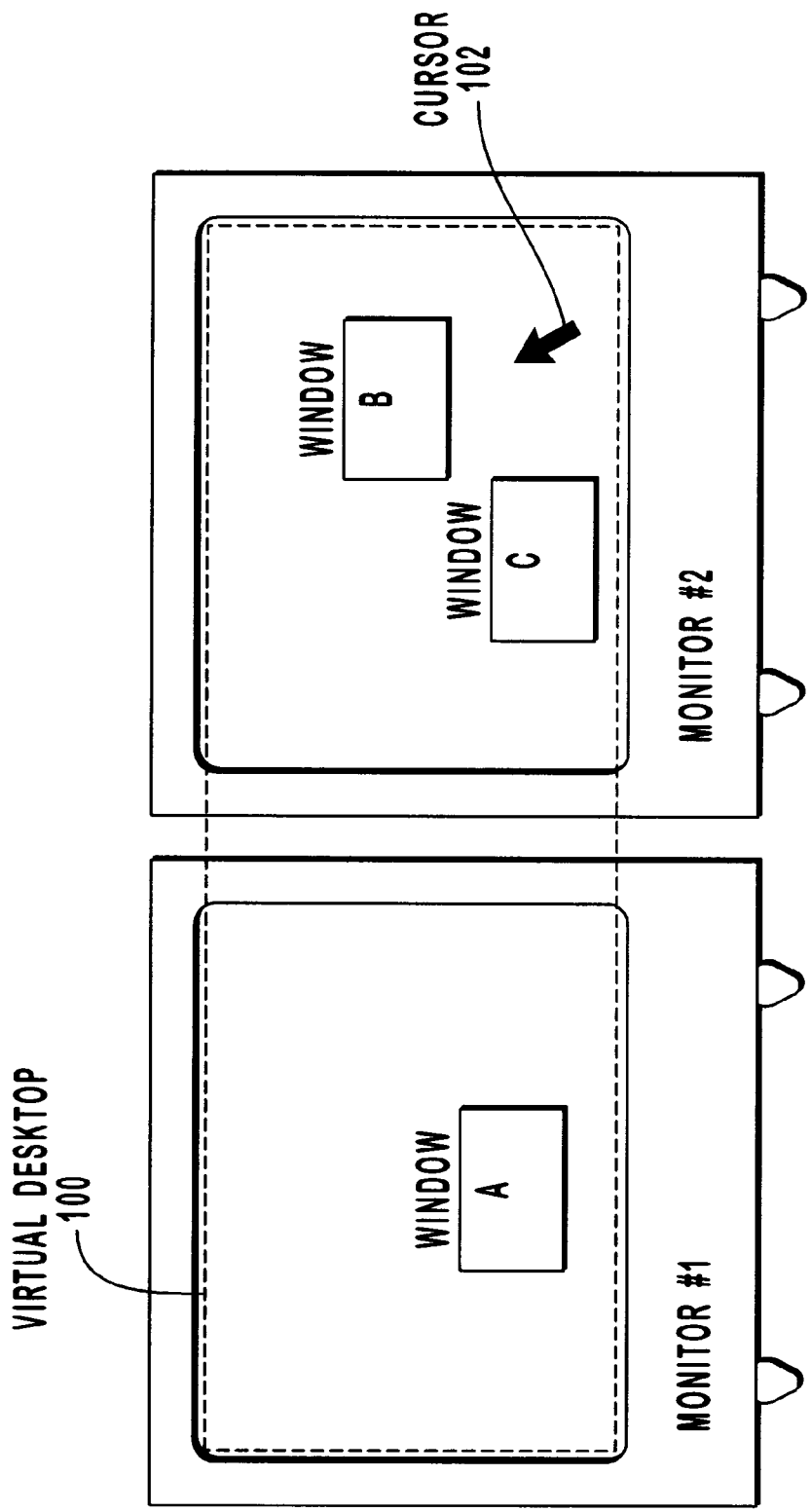
FIGS. 15(a)–15(d) are dual monitor diagrams showing an example of repositioning windows in response to a change in monitor space geometry.

FIGS. 15(a)–15(d) illustrate an example situation in which the USER reconfiguration code manages windows in response to a geometry change to ensure robust interaction with the end-user. In FIG. 15(a), a horizontally oriented virtual desktop 100 is composed of two monitor spaces (corresponding to monitors #1 and #2) arranged side-by-side. Three windows, A, B and C, and a cursor image 102 are present on the virtual desktop 100.

Assume the end-user decides that a vertically oriented desktop is preferable so he physically moves monitor #2 from its location next to monitor #1 and places it on top of monitor #1. At that point, the situation would appear as in FIG. 15(b). Although monitor #2 physically is on top of monitor #1 so that windows B and C physically appear above window A, USER will continue to treat the virtual desktop and its windows as if the desktop 100 is horizontally oriented because USER is unaware that the physical monitor geometry has changed and thus has not yet reoriented the desktop.

Figure 15B:
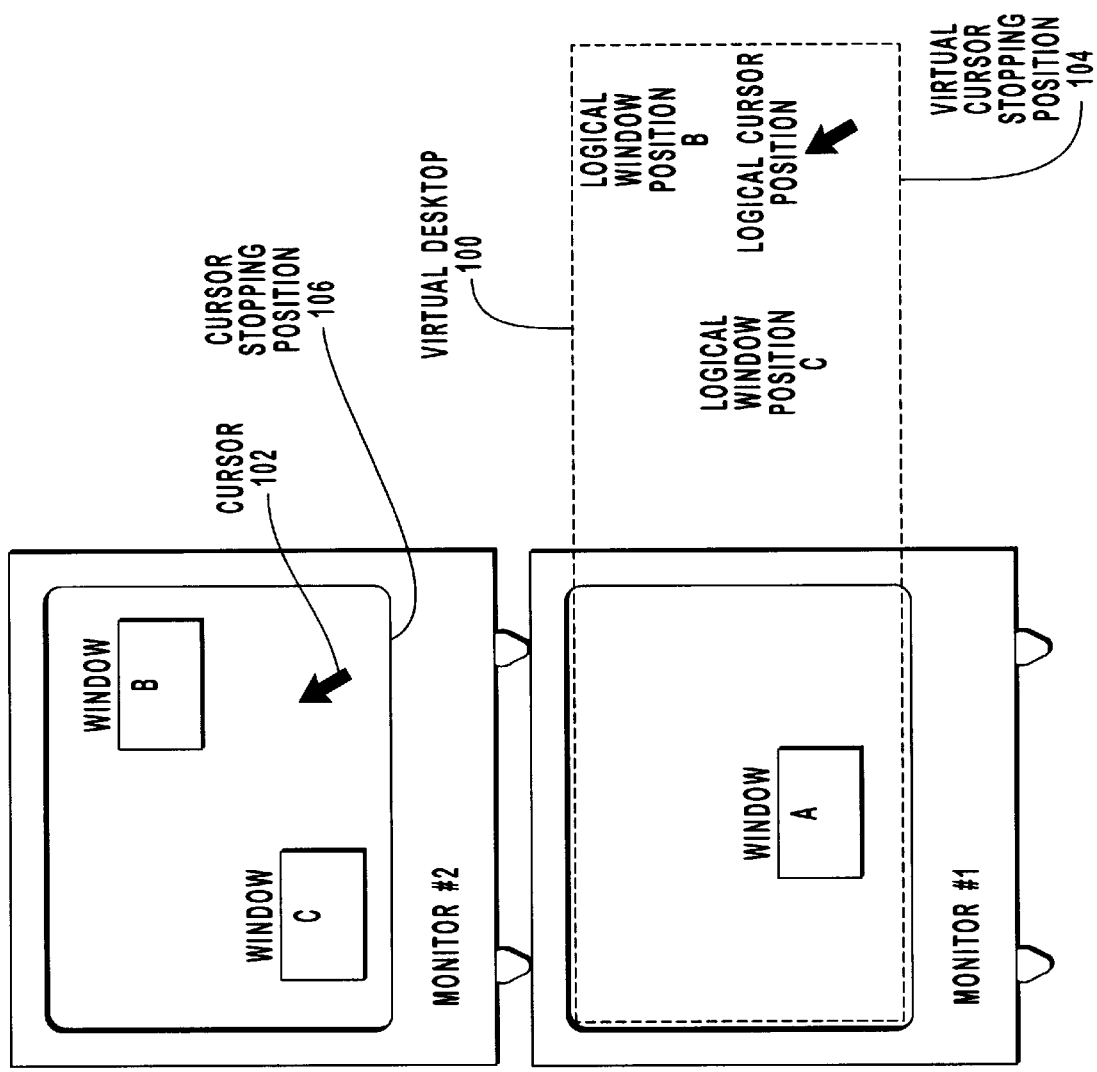

Although USER and any applications that may be running will not experience any problems, the state of affairs shown in FIG. 15(b) tends to confuse end-users. For example, suppose in FIG. 15(b) the end-user wanted to move the cursor image 102 so that it moves from monitor #2 to monitor #1. The end-user's natural tendency to accomplish this result would be to move the mouse toward him, expecting the cursor image 102 to translate downward towards and into monitor #1. However, because the virtual desktop remains horizontally oriented, the cursor image 102 would stop as soon as it reached the bottom of the screen in monitor #2 at position 106 (corresponding to position 104 of the logical cursor on the virtual desktop).

To avoid such confusion, the end-user informs USER of the change in physical monitor position so that the reconfiguration code can perform a corresponding reconfiguration of the virtual desktop in logical space. To do so, the end-user interacts with the "Monitors" window shown in FIGS. 10(a) and 10(b). In particular, the end-user moves the icon 108 that represents monitor #2 from its position next to the icon 110 representing monitor #1 (FIG. 10(a)) to a position on top of icon 110 (FIG. 10(b)). The reconfiguration code subsequently uses the positional information provided by the end-user in reorienting the virtual desktop 100 to a vertical orientation as shown in FIG. 15(c).

Figure 15C:
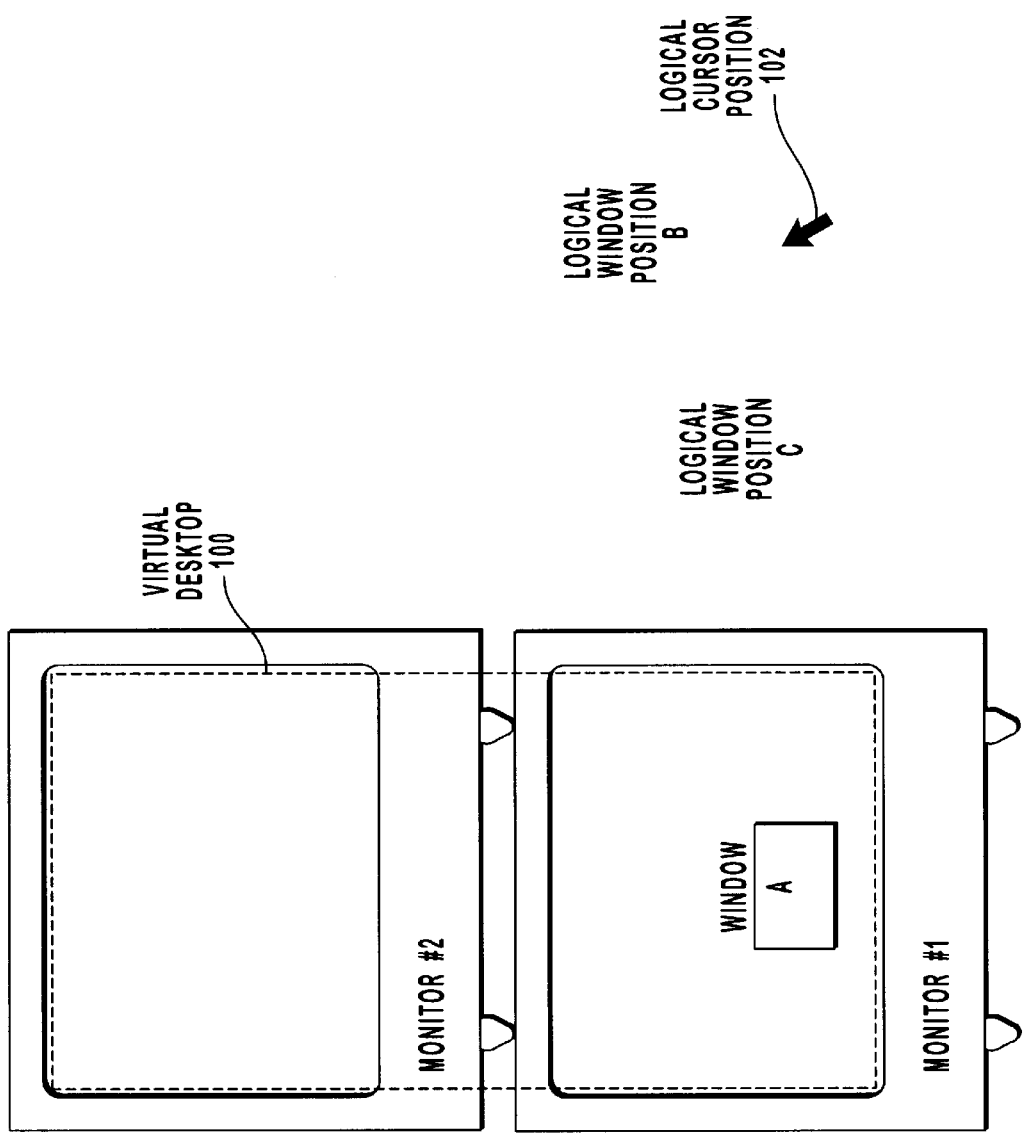

However, if USER were to change the orientation of the virtual desktop in the manner shown in FIG. 15(c) while leaving windows B and C and cursor image 102 at their same respective positions in logical space, the end-user would again become confused. As shown in FIG. 15(c), reorientation of the desktop 100 caused it to no longer contain windows B and C. Consequently, the cursor image and windows B and C would appear to the end-user to vanish the instant that USER reoriented the virtual desktop.

Figure 15D:
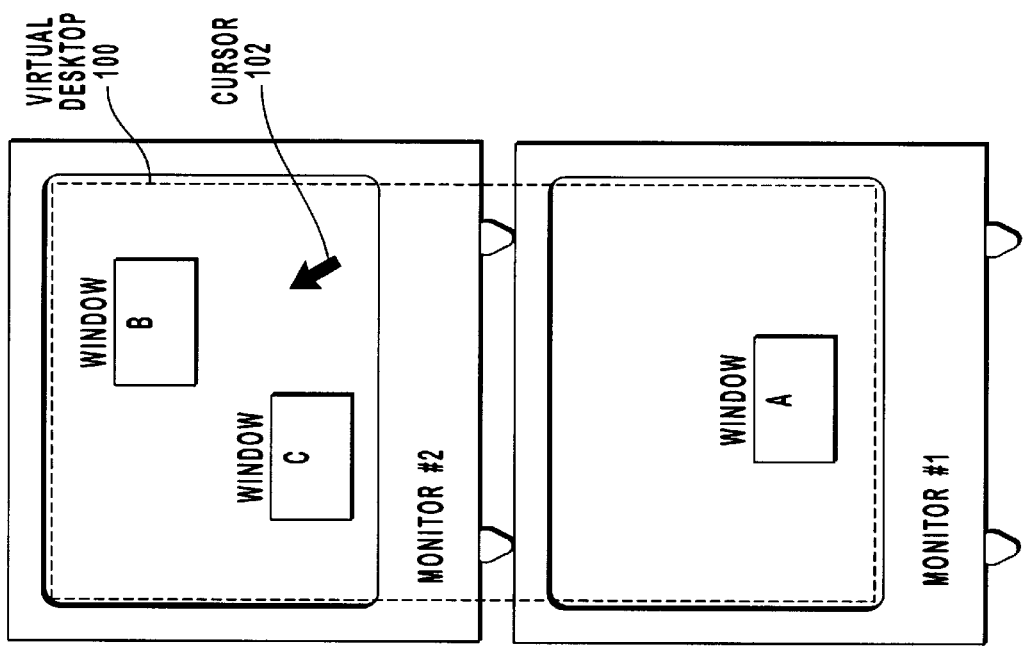

To prevent such end-user confusion, USER repositions the cursor image and windows so that they are visible to the end-user as shown in FIG. 15(d). The cursor image 102 and windows B and C are moved in logical space to appear at their same respective positions in monitor #2, relative to the origin of monitor #2, as they did just prior to the geometry change. The USER reconfiguration code accomplishes this by taking a "snapshot" of the virtual desktop layout (i.e., by saving in a data structure coordinate data that defines the relative positions of the monitor spaces) just prior to effecting a logical monitor geometry change. During the geometry change, USER uses the snapshot data structures to reposition the windows so that they appear in the same place relative to the monitor on which they appeared just prior to the logical monitor geometry change.

Figure 16A:
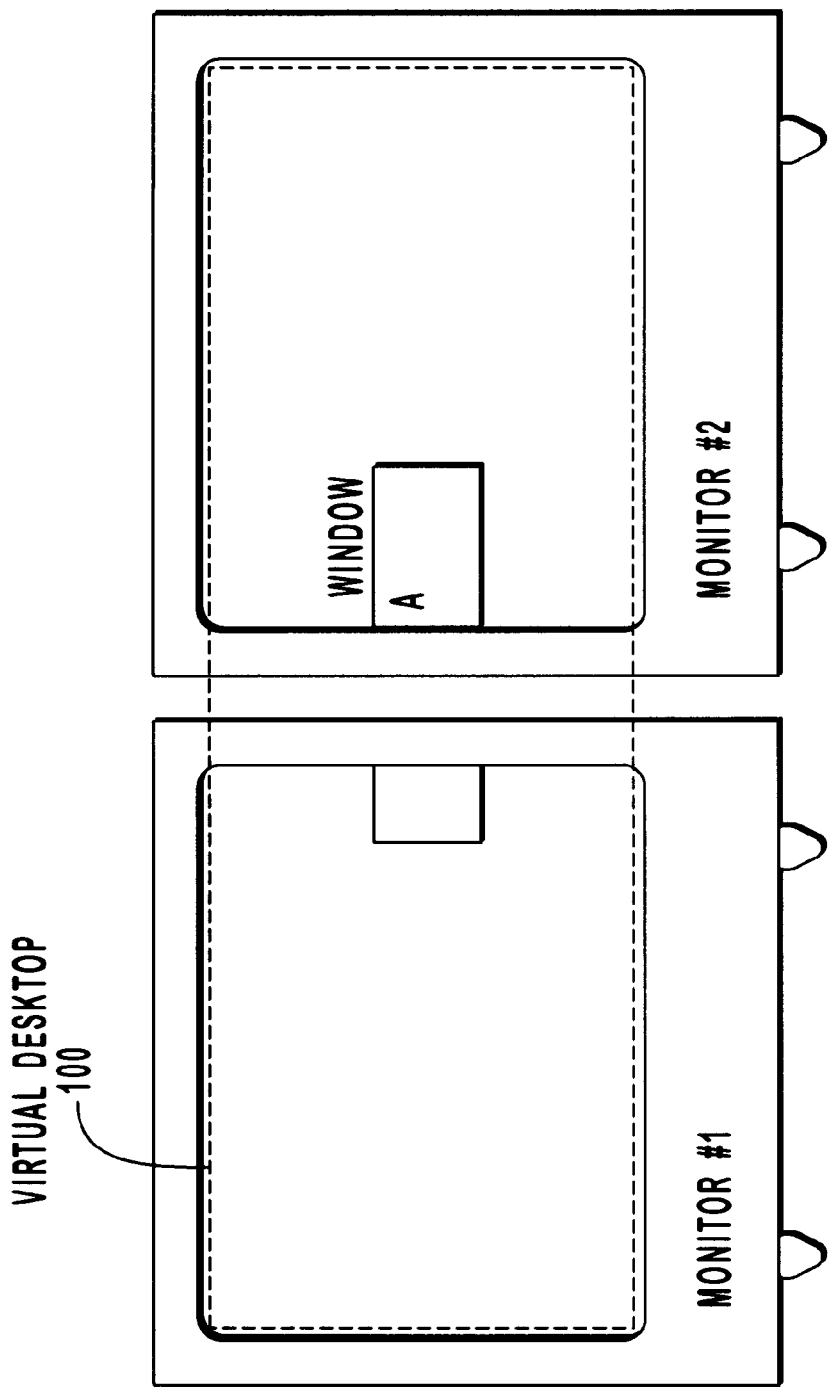
FIGS. 16(a)–16(c) are dual monitor diagrams showing an example of repositioning a straddling window in response to a change in monitor space geometry.
Figure 16B:
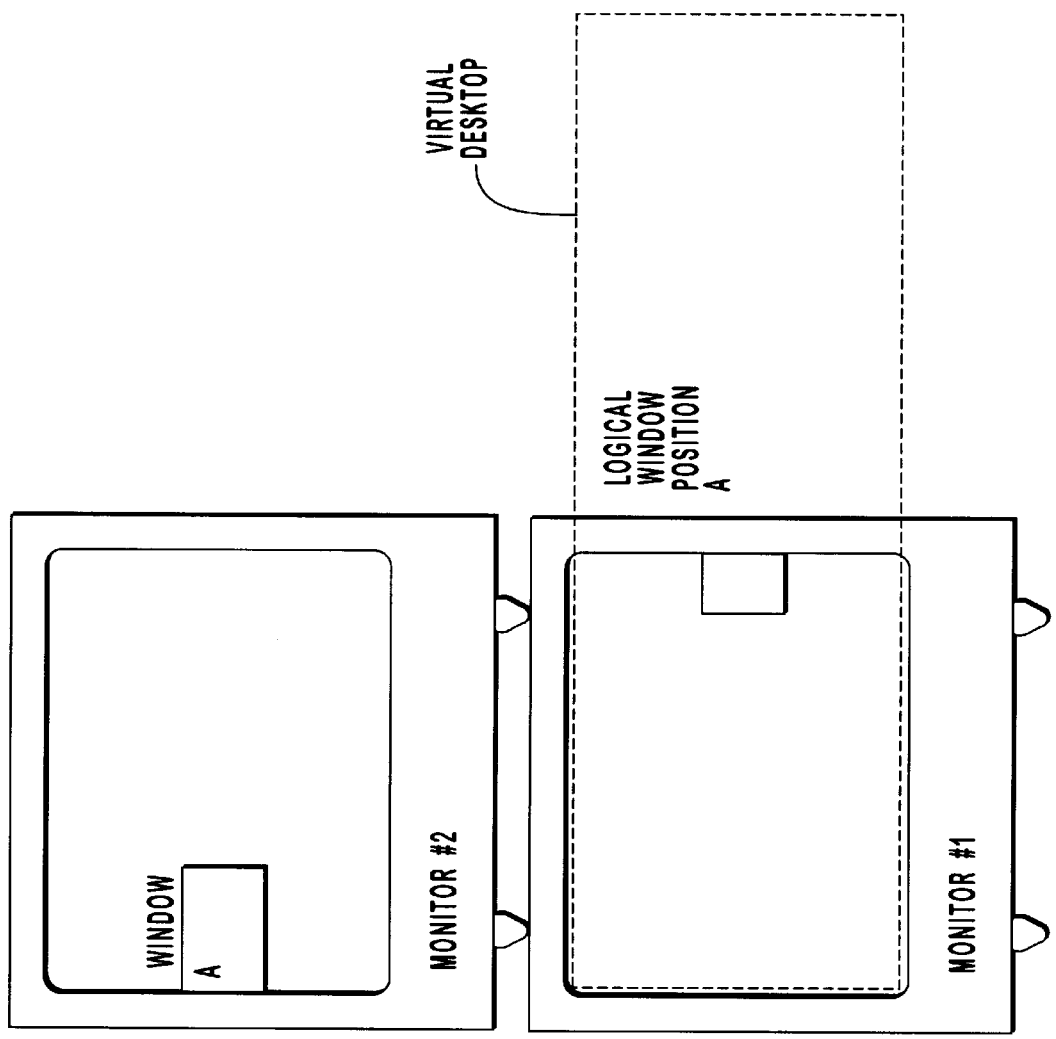
Figure 16C:
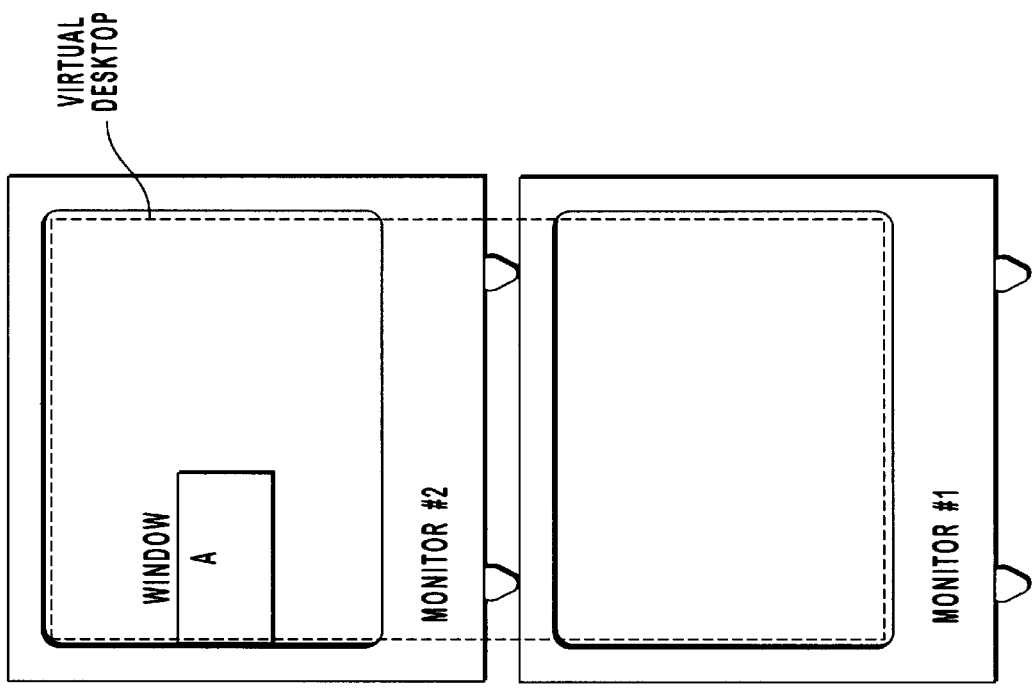

Another example situation in which the USER reconfiguration code dynamically repositions windows in response to a geometry change is shown in FIGS. 16(a)–16(c). In FIG. 16(a), window A is positioned such that it straddles the boundary between the two monitor spaces corresponding to monitors #1 and #2. In FIG. 16(b), the end-user has physically placed monitor #2 on top of monitor #1 such that the two portions of window A are no longer adjacent. When the end-user interacts with the monitor positioning window to tell USER about the geometry change, the USER reconfiguration code automatically repositions window A so that it appears entirely within a single monitor space as shown in FIG. 16(c). USER picks the monitor space based on the relative amounts of window area that appeared in each monitor space prior to the geometry change. In the example shown, USER picked monitor #2 for display of window A because, as shown in FIG. 16(a), it contained a larger portion of window A than did monitor #1 just prior to the geometry change.

Figure 17A:
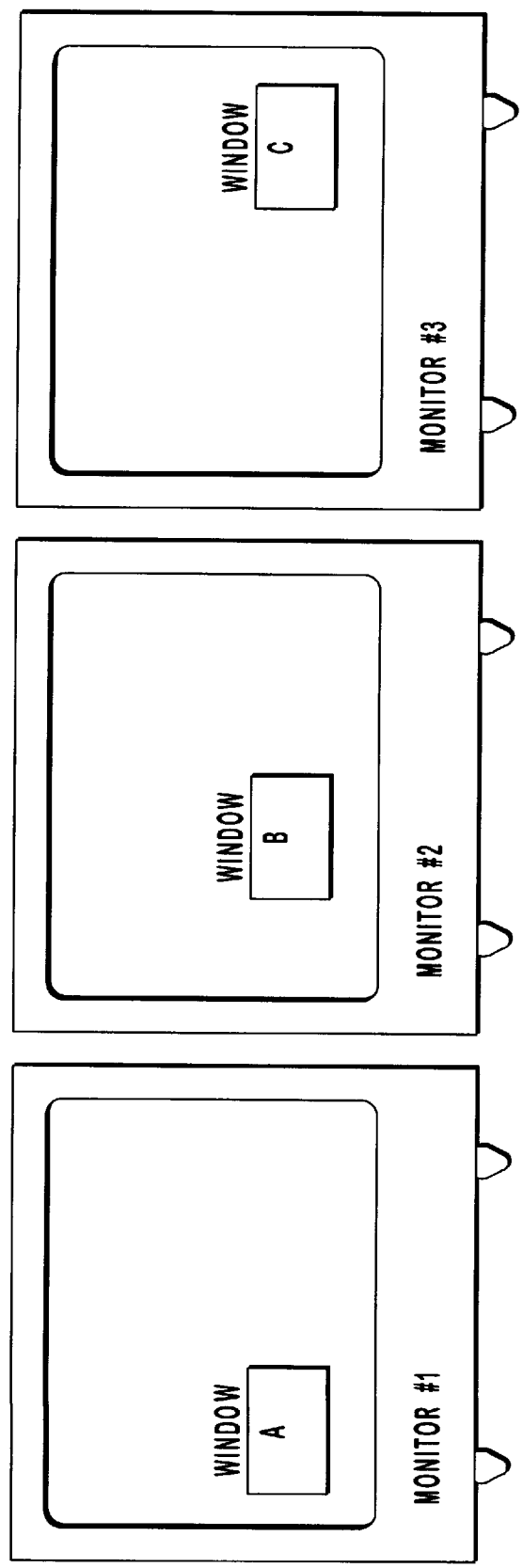
FIGS. 17(a)–17(c) are dual monitor diagrams showing an example of repositioning an orphaned window in response to a change in monitor space geometry.
Figure 17B:
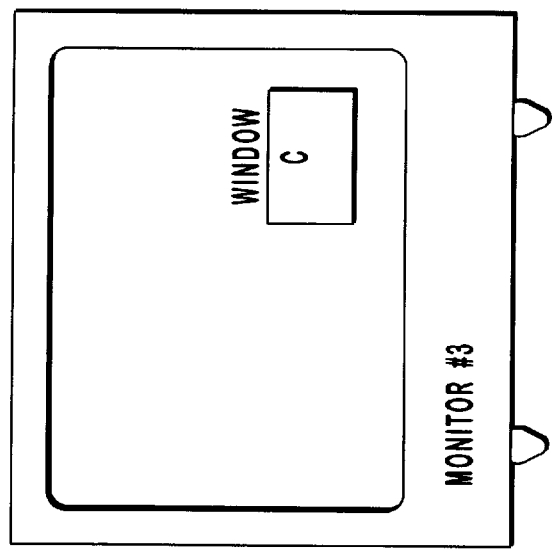
Figure 17B:
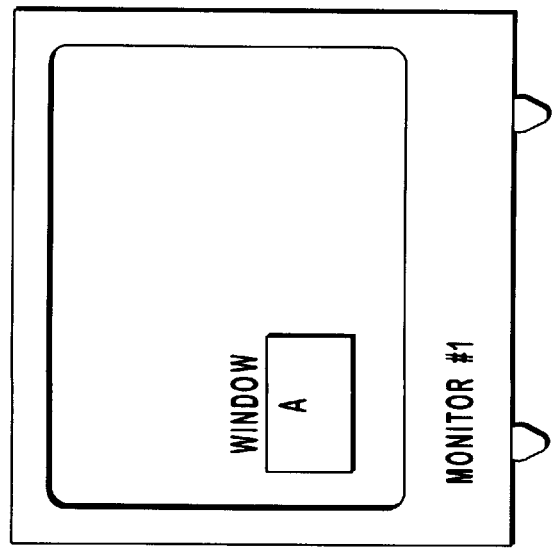
Figure 17C:
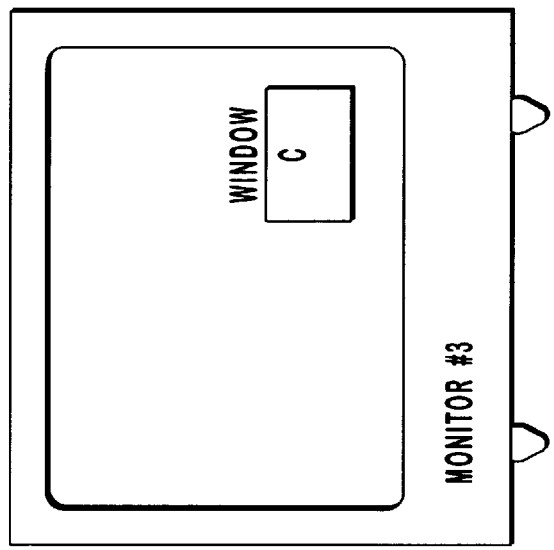
Figure 17C:
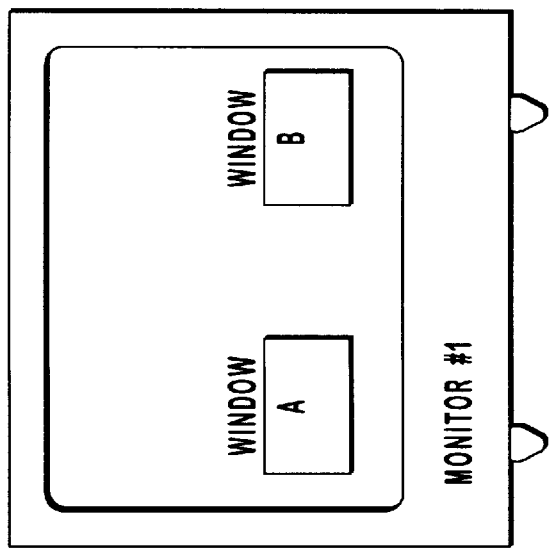

Yet another example situation in which the USER reconfiguration code dynamically repositions windows in response to a geometry change is shown in FIGS. 17(a)–17(c). In this example, the virtual desktop is formed from the three monitor spaces corresponding to monitors #1, #2 and #3, and has three windows—A, B and C—displayed therein. Assume that monitor #2 is deactivated subsequently either by equipment failure or by intentional actions of the end-user. This results in window B being "orphaned" (i.e., no longer appearing in an available monitor space) and thus rendered invisible to the end-user as shown in FIG. 17(b). In this situation, the end-user likely would become confused by the disappearance of window B and/or frustrated by the fact that he could not move window B back into view because its title bar was not visible for a dragging operation. In this case, after the end-user has informed USER of the geometry change, the reconfiguration code will move the orphaned window in logical space such that it appears entirely within the monitor space to which it is closest—monitor #1 in the case shown in FIG. 17(c).

Accordingly, using the techniques described above, the USER reconfiguration code, at boot-time and in a dynamic fashion in response to a geometry change during run-time, ensures that the user is presented with a robust virtual desktop environment when operating in the multiple monitor domain.

Other embodiments are within the scope of the following claims.

APPENDIX A

```
// INTERSECTION_AXIS ()
// This macro tells us how a particular set of overlapping rectangles
// should be adjusted to remove the overlap. It is basically a condensed
// version of a lookup table that does the same job. The parameters for the
// macro are two rectangles, where one is the intersection of the other with
// a third (unspecified) rectangle. The macro compares the edges of the
// rectangles to determine which sides of the intersection were "caused" by
// the source rectangle. In the pre-condensed version of this macro, the
// results of these comparisons (4 bits) would be used to index into a 16
// entry table which specifies the way to resolve the overlap. However, this
// is highly redundant, as the table would actually respresents several rotated
// and/or inverted instances of a few basic relationships:
//
//       Horizontal   Vertical   Diagonal   Contained           Crossing
//          *--*      *-------*   *-----*    *--------*          *----*
//        *-+-*       | *-* |    | *-+-*    | *-* |        and  *-+--+-*
//        | | |       *-+-+-*    | | |      | * * |             | |  | |
//        *-+-*       | |         *-+-*     | *-* |             *-+--+-*
//          *--*      * *          *-----*   *--------*          *----*
//
//
// What we are really interested in determining is whether we "should" move
// the rectangles horizontally or vertically to resolve the overlap, hence we
// are testing for three states; Horizontal, Vertical and Don't Know.
//
// The macro gives us these three states by XORing the high and low bits of
// of the comparison to reduce the table to 4 cases where 1 and 2 are
// vertical and horizontal respectively, and then subtracting 1 so that the
// 2 bit signifies "unknown-ness."
//
// Note that there are some one-off cases in the comparisons because we are
// not actually looking at the third rectangle. However this greatly reduces
// the complexity so these small errors are acceptible given the scale of the
// rectangles we are comparing.
//
// -------------------------------------------------------------------------
#define INTERSECTION_AXIS(a, b)                            \
    (((((a->left == b->left) << 1) | (a->top == b->top)) ^ \
    (((a->right == b->right) << 1) | (a->bottom == b->bottom))) - 1)
#define INTERSECTION_AXIS_VERTICAL          (0)
#define INTERSECTION_AXIS_HORIZONTAL        (1)
#define INTERSECTION_AXIS_UNKNOWN(code)     (code & 2)
// -------------------------------------------------------------------------
//
// RemoveOverlap ()
```

APPENDIX A-continued

```
//   This is called from RemoveOverlaps to resolve conflicts when two
// rectangles overlap. It returns the PMONITOR for the monitor is decided to
// move. This routine always moves rectangles away from the origin so it can
// be used to converge on a zero-overlap configuration.
//
// This function will bias slightly toward moving lprc2 (all other things
// being equal).
//
// ---------------------------------------------------------------------------
LPRECT NEAR PASCAL RemoveOverlap (LPRECT lprc1, LPRECT lprc2, LPRECT lprcI)
{
   LPRECT lprcMove, lprcStay;
   POINT ptC1, ptC2;
   BOOL fNegative;
   BOOL fC1Neg;
   BOOL fC2Neg;
   int dC1, dC2;
   int XOffset;
   int yOffset;
   int nAxis;
   //
   // Compute the centers of both rectangles. We will need them later.
   //
   ptC1.x = RectCenterX(lprc1);
   ptC1.y = RectCenterY(lprc1);
   ptC2.x = RectCenterX(lprc2);
   ptc2.y = RectCenterY(lprc2);
   //
   // Decide whether we should move things horizontally or vertically. All
   // this goop is here so it will "feel" right when the system needs to
   // move a monitor on you.
   //
   nAxis = INTERSECTION_AXIS(lprcI, lprc1);
   if (INTERSECTION_AXIS_UNKNOWN(nAxis))
   {
      //
      // Is this a "big" intersection between two rectangles?
      //
      if (PtInRect(lprcI, ptc1 || PtInRect(lprcI, ptC2))
      {
         //
         // This is a "big" overlap. Decide if the rectangles
         // are aligned more "horizontal-ish" or "vertical-ish."
         //
         xOffset = ptC1.x - ptC2.x;
         if (xOffset < 0)
            xOffset *= -1;
         yOffset = ptC1.y - ptC2.y;
         if (yOffset < 0)
            yOffset *= -1;
         if (xOffset >= yOffset)
            nAxis = INTERSECTION_AXIS_HORIZONTAL;
         else;
            nAxis = INTERSECTION_AXIS_VERTICAL;
      }
      else
      {
         //
         // This is a "small" overlap. Move the rectangles the
         // smallest distance that will fix the overlap.
         //
         if ((lprcI->right - lprcI->left) <= (lprcI->bottom - lprcI->top))
            nAxis = INTERSECTION_AXIS_HORIZONTAL;
         else;
            nAxis = INTERSECTION_AXIS_VERTICAL;
      }
   }
   //
   // We now need to pick the rectangle to move. Move the one
   // that is further from the origin along the axis of motion.
   //
   if (nAxis == INTERSECTION_AXIS_HORIZONTAL)
   {
      dC1 = ptC1.x;
      dC2 = ptC2.x;
   }
   else
   {
      dC1 = ptc1.y;
```

APPENDIX A-continued

```
    dC2 = ptC2.y;
}
if ((fC1Neg = (dC1 < 0)) != 0)
    dC1 *= -1;
if ((fC2Neg = (dC2 < 0)) != 0)
    dC2 *= -1;
if (dC2 < dC1)
{
    lprcMove = lprc1;
    lprcStay = lprc2;
    fNegative = fC1Neg;
}
else
{
    lprcMove = lprc2;
    lprcStay = lprc1;
    fNegative = fC1Neg;
}
// Compute a new home for the rectangle and put it there.
//
if (nAxis = INTERSECTION_AXIS_HORIZONTAL)
{
    int xPos;
    if (fNegative)
        xPos = lprcStay->left - (lprcMove->right - lprcMove->left);
    else
        xPos = lprcStay->right;
    xOffset = xPos-lprcMove->left
    yOffset = 0;
}
else
{
    int yPos;
    if (fNegative)
        yPos = lprcStay->top - (lprcMove->bottom - lprcMove->top);
    else
        yPos = lprcStay->bottom;
    yOffset = yPos - lprcMove->top;
    xOffset = 0;
}
OffsetRect(lprcMove, xOffset, yOffset);
return lprcMove;
}
```

What is claimed is:

1. A method, performed by a computer system, of arranging monitors in logical space, the method comprising:
   determining relative positions in logical space for a plurality of monitor spaces;
   comparing the relative positions of the monitor spaces; and
   positioning the monitor spaces in logical space based on a result of the comparing to form a contiguous and non-overlapping region.

2. The method of claim 1 wherein the determining, comparing and positioning are performed upon initialization of the computer system.

3. The method of claim 1 wherein the determining, comparing and positioning are performed automatically in response to a geometry change for one or more of the monitor spaces.

4. The method of claim 3 wherein the geometry change comprises adding a monitor space to the computer system.

5. The method of claim 3 wherein the geometry change comprises removing a monitor space from the computer system.

6. The method of claim 3 wherein the geometry change comprises changing a characteristic of a monitor space.

7. The method of claim 6 wherein the changed monitor space characteristic comprises a resolution parameter.

8. The method of claim 1 wherein the comparing comprises iteratively comparing the position of each monitor space against every other monitor space.

9. The method of claim 1 wherein the comparing comprises determining whether any two monitor spaces overlap one another.

10. The method of claim 1 wherein the comparing comprises determining whether gaps exist between the monitor spaces.

11. The method of claim 1 wherein the positioning comprises placing a monitor space at a constrained location in logical space.

12. The method of claim 11 further comprising choosing the constrained location such that it enhances efficiency in an operating system of the computer system.

13. The method of claim 11 wherein the constrained location comprises a boundary aligned at a predetermined number of units in logical space.

14. The method of claim 1 wherein the positioning comprises moving the monitor spaces inward in logical space to remove gaps between monitor spaces.

15. The method of claim 1 wherein the positioning comprises moving the monitor spaces outward in logical space until no monitor space overlaps any other monitor space.

16. The method of claim 15 wherein the positioning further comprises moving the monitor spaces inward in logical space to remove gaps between monitor spaces.

17. The method of claim 1 wherein the comparing comprises comparing the respective positions of two monitor spaces relative to a predetermined location, and the positioning comprises moving one of the two monitor spaces based on a relationship between the predetermined location and the position of the monitor space to be moved.

18. The method of claim 17 wherein the predetermined location comprises a center of a virtual desktop.

19. The method of claim 17 wherein the one of the two monitor spaces that has a center point farther from the predetermined location is moved.

20. The method of claim 19 wherein the monitor space is moved outward in logical space.

21. The method of claim 1 wherein the comparing comprises determining whether a horizontal overlap exists between two monitor spaces.

22. The method of claim 1 wherein the comparing comprises determining whether a vertical overlap exists between two monitor spaces.

23. The method of claim 1 wherein the comparing comprises determining whether one monitor space contains the center of another monitor space.

24. The method of claim 1 wherein the comparing comprises determining whether two monitor spaces are closer to being horizontally aligned or closer to being vertically aligned.

25. A method, performed on a computer system, of managing the display of a graphic object positioned within a logical display space that comprises a plurality of monitor spaces, the method comprising:

sensing a geometry change within the display space;

recording a position for each of the monitor spaces that forms the logical display space; and manipulating the graphic object in response to the geometry change.

26. The method of claim 25 wherein the recording comprises saving coordinate values in a data structure.

27. The method of claim 25 wherein the geometry change comprises an addition or a removal of a monitor space.

28. The method of claim 25 wherein the geometry change comprises a change in a monitor space characteristic.

29. The method of claim 25 wherein the geometry change comprises a change in position in logical space of a monitor space.

30. The method of claim 25 wherein the geometry change comprises a change of shape in the display space.

31. The method of claim 25 wherein the geometry change comprises a change of orientation of the display space.

32. The method of claim 31 wherein the manipulating comprises moving the graphic object in logical space to compensate for the change in orientation of the display space.

33. The method of claim 25 wherein the logical display space comprises a contiguous, non-overlapping virtual desktop.

34. The method of claim 25 wherein the manipulating comprises moving the graphic object in logical space.

35. The method of claim 34 wherein the moving comprises repositioning the graphic object in logical space relative to the display space.

36. The method of claim 25 wherein the manipulating comprises moving the graphic object in logical space such that the graphic object remains in a same location relative to a monitor space.

37. The method of claim 25 wherein the geometry change comprises a removal of a monitor space and the manipulating comprises moving the graphic object to a different monitor space.

38. A computer program, residing on a computer readable medium, for arranging a plurality of monitor spaces in logical space, the computer program comprising instructions to:

(a) select a monitor space from among the plurality of monitor spaces;

(b) compare a position in logical space of the monitor space selected in (a) with another monitor space;

(c) move one of the two chosen monitor spaces based on a result of (b);

(d) repeat (b) and (c) until the monitor space selected in (a) does not overlap any other monitor space; and (e) repeat (a), (b), (c) and (d) until no monitor space overlaps any other monitor space.

39. The computer program of claim 38 wherein one of the two monitor spaces is moved in (c) if the comparison in (b) determines that an overlap exists between the monitor spaces.

40. The computer program of claim 38 wherein one of the two monitor spaces is moved outward in logical space in (c).

41. The computer program of claim 38 wherein one of the two monitor spaces that has a center point farther from a predetermined location is moved outward in logical space in (c).

42. The computer program of claim 38 further comprising instructions to:

(f) select a monitor space from among the plurality of monitor spaces;

(g) designate the chosen monitor space as belonging to a known group and the unchosen monitor space or spaces as belonging to a unknown group;

(h) select a monitor space from the unknown group based on a relationship between the selected monitor space and the known group;

(i) move the monitor space selected in (h) in logical space;

(j) designate the monitor space selected in (h) as belonging to the known group; and (k) repeat (h), (i) and (j) until the monitor spaces form a contiguous region.

43. The computer program of claim 42 wherein (h) comprises instructions to deselect a monitor space if it would overlap any other monitor space in the unknown group upon being moved.

44. The computer program of claim 42 wherein a monitor space closest to a predetermined location is selected in (f).

45. The computer program of claim 44 wherein the predetermined location comprises a center of a virtual desktop.

46. The computer program of claim 42 wherein (i) comprises instructions to move the monitor space selected in (h) to a position in logical space at which that monitor space is contiguous with a monitor space in the known group.

47. The computer program of claim 42 wherein the monitor space is moved horizontally or vertically in (i).

48. The computer program of claim 42 wherein successive iterations of (i) cause the monitor spaces to move towards each other.

* * * * *